United States Patent
Goldman et al.

(10) Patent No.: US 12,344,350 B2
(45) Date of Patent: Jul. 1, 2025

(54) MID-DRIVE E-BIKE

(71) Applicant: CHARGEBIKE LTD, Netanya (IL)

(72) Inventors: Alon Goldman, Netanya (IL); Michael Nenner Weil, Tel-Aviv (IL)

(73) Assignee: CHARGEBIKE LTD, Natanya (IL)

(*) Notice: Subject to any disclaimer, the term of this patent is extended or adjusted under 35 U.S.C. 154(b) by 242 days.

(21) Appl. No.: 18/207,306

(22) Filed: Jun. 8, 2023

(65) Prior Publication Data
US 2024/0409179 A1    Dec. 12, 2024

(51) Int. Cl.
*B62M 6/45*   (2010.01)
*B60L 7/00*   (2006.01)
*B60W 30/18*  (2012.01)
*B62M 11/14*  (2006.01)

(52) U.S. Cl.
CPC .............. *B62M 6/45* (2013.01); *B60L 7/006* (2013.01); *B60W 30/18127* (2013.01); *B62M 11/14* (2013.01)

(58) Field of Classification Search
CPC .......... B62M 6/55; B62M 6/45; B62M 11/18; B62M 11/16; B62M 11/14; B62M 6/50; B62M 9/10; B60L 7/006; B60L 2200/12; B60L 2240/12; B60L 2240/421; B60L 2240/423; B60L 2250/26; B60L 50/20; B60W 30/18127; B62J 45/412; F16H 3/66
USPC ........................................ 318/374, 376, 362
See application file for complete search history.

(56) References Cited

U.S. PATENT DOCUMENTS

| | | |
|---|---|---|
| 6,176,808 B1 | 1/2001 | Brown et al. |
| 7,040,440 B2 | 5/2006 | Kurita et al. |
| 8,684,122 B2 | 4/2014 | Maeno et al. |
| 10,442,434 B2 | 10/2019 | Huh et al. |
| 2010/0258372 A1 | 10/2010 | Anderson |
| 2012/0097467 A1 | 4/2012 | Maeno et al. |
| 2014/0300078 A1 | 10/2014 | Ruffieux et al. |
| 2016/0159431 A1 | 6/2016 | Hayslett et al. |
| 2016/0297500 A1 | 10/2016 | Dubose |

(Continued)

FOREIGN PATENT DOCUMENTS

| | | |
|---|---|---|
| CN | 108749992 A | 11/2018 |
| CN | 109210156 A | 1/2019 |

(Continued)

*Primary Examiner* — Antony M Paul
(74) *Attorney, Agent, or Firm* — SOROKER AGMON NORDMAN RIBA

(57) ABSTRACT

There is provided a powertrain of a mid-drive electric bicycle that enables regenerative braking. The powertrain comprising a mid-drive electric motor, a chain rotatably connected to the mid-drive electric motor, a gearing system mounted in a rear wheel bub, the gearing system rotatably connected to the chain, a mechanical brake connected to a component of the gearing system, and a control system. During operation of the mechanical brake, the gearing system is configured to cause rotation of the chain in a backward direction opposite to the forward driving direction, which mechanically forces the mid-drive electric motor to rotate in the backward direction, to thereby regenerate electric energy. There is further provided a crankset configured to prevent rotation of pedals of the electric bicycle in a backwards driving direction during backwards rotation of the chain in braking mode.

20 Claims, 15 Drawing Sheets

(56) References Cited

U.S. PATENT DOCUMENTS

| | | |
|---|---|---|
| 2016/0339993 A1 | 11/2016 | Hayslett et al. |
| 2017/0029068 A1 | 2/2017 | Hayslett et al. |
| 2017/0050700 A1 | 2/2017 | Lemmens |
| 2021/0039746 A1 | 2/2021 | Tenberge et al. |
| 2022/0219778 A1* | 7/2022 | Corbett ............... B60L 15/2009 |

FOREIGN PATENT DOCUMENTS

| | | |
|---|---|---|
| DE | 102019108378 A1 | 10/2020 |
| EP | 3862256 A1 | 8/2021 |
| JP | 2010095203 | 4/2010 |
| WO | 2012026325 | 3/2012 |

* cited by examiner

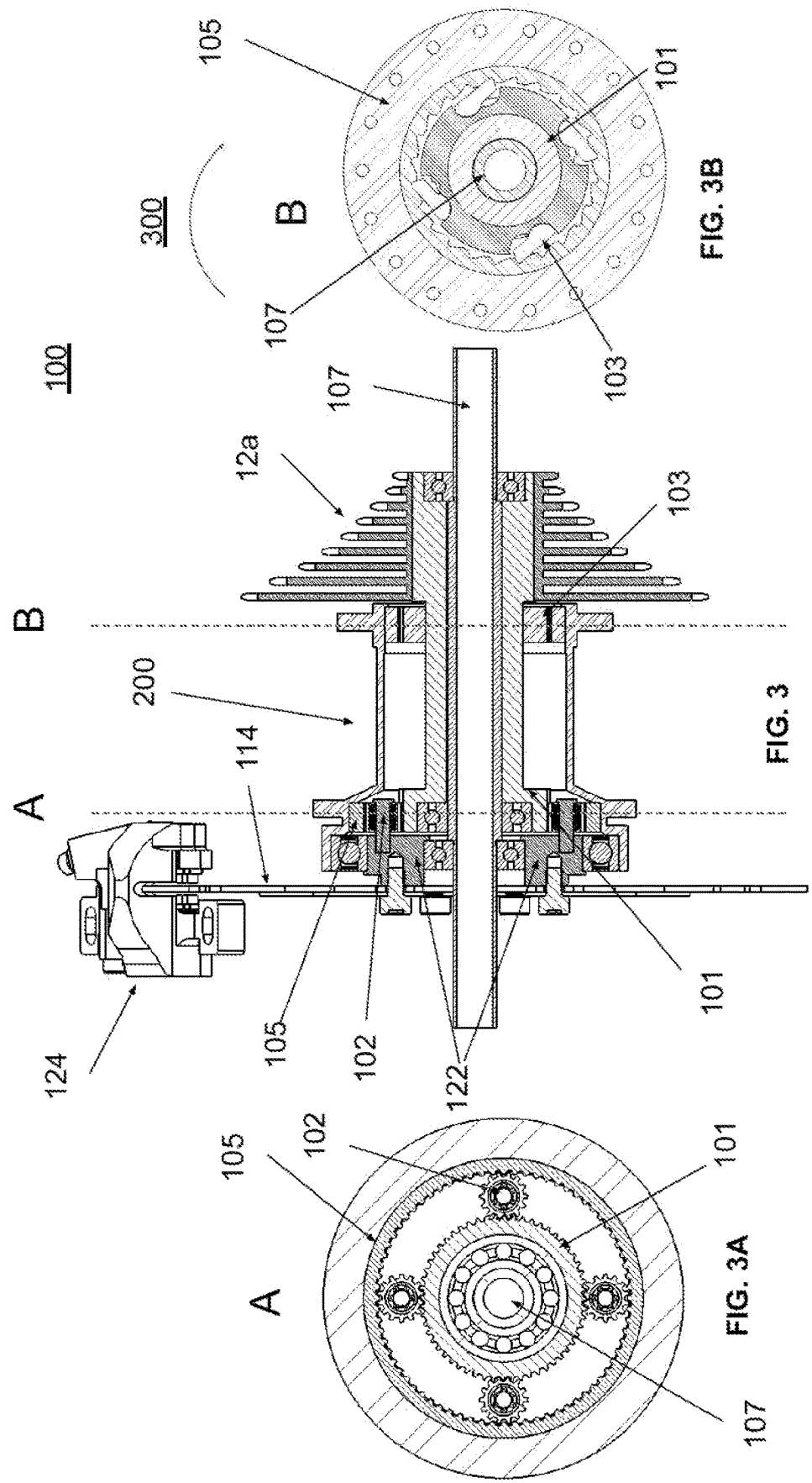

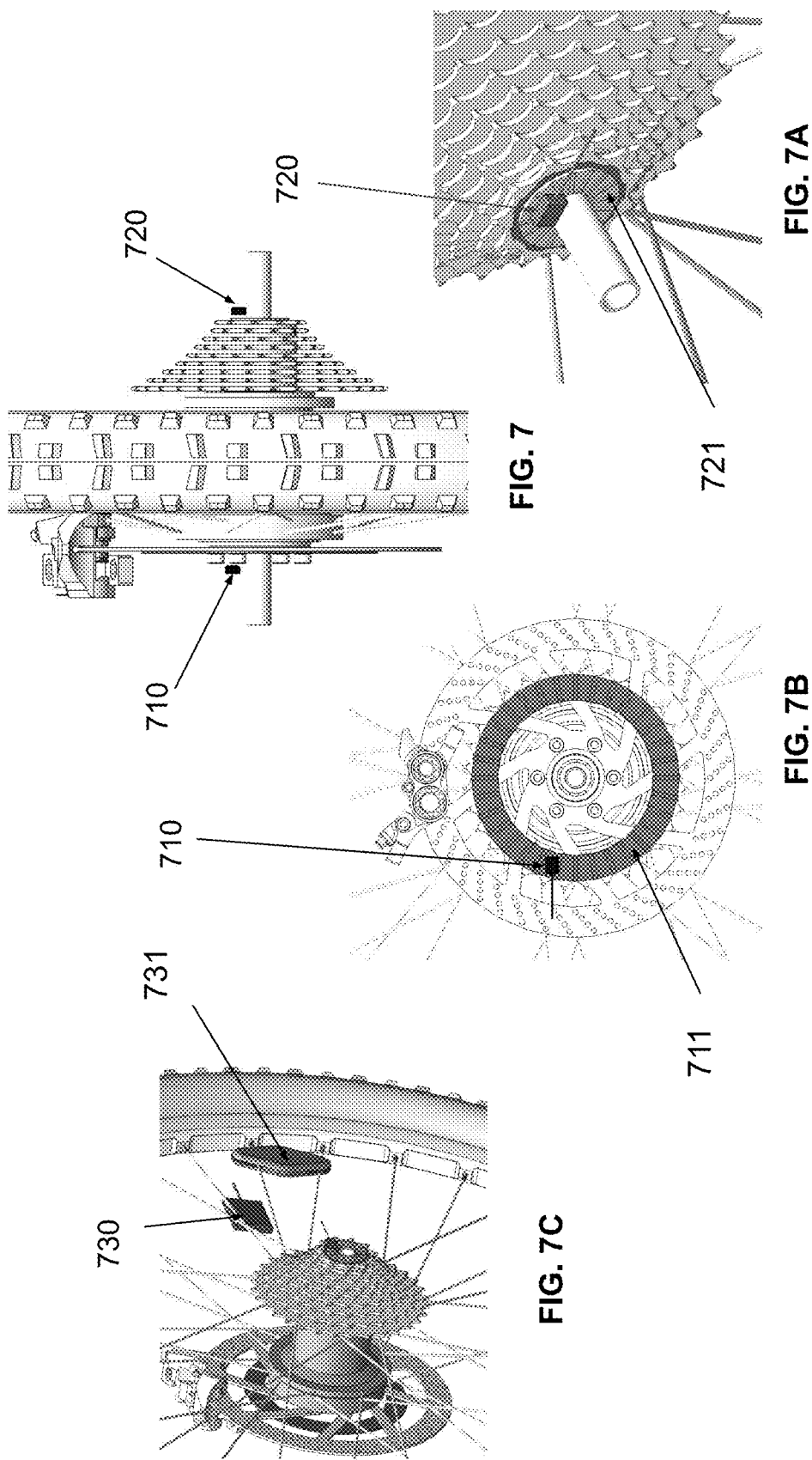

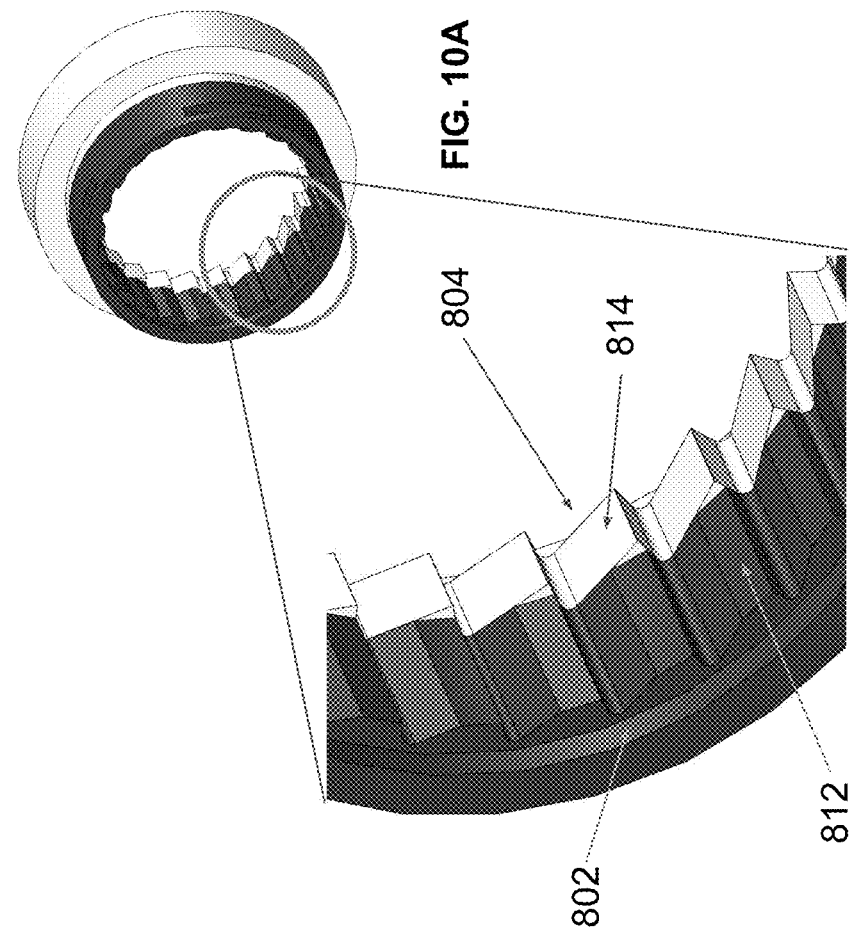
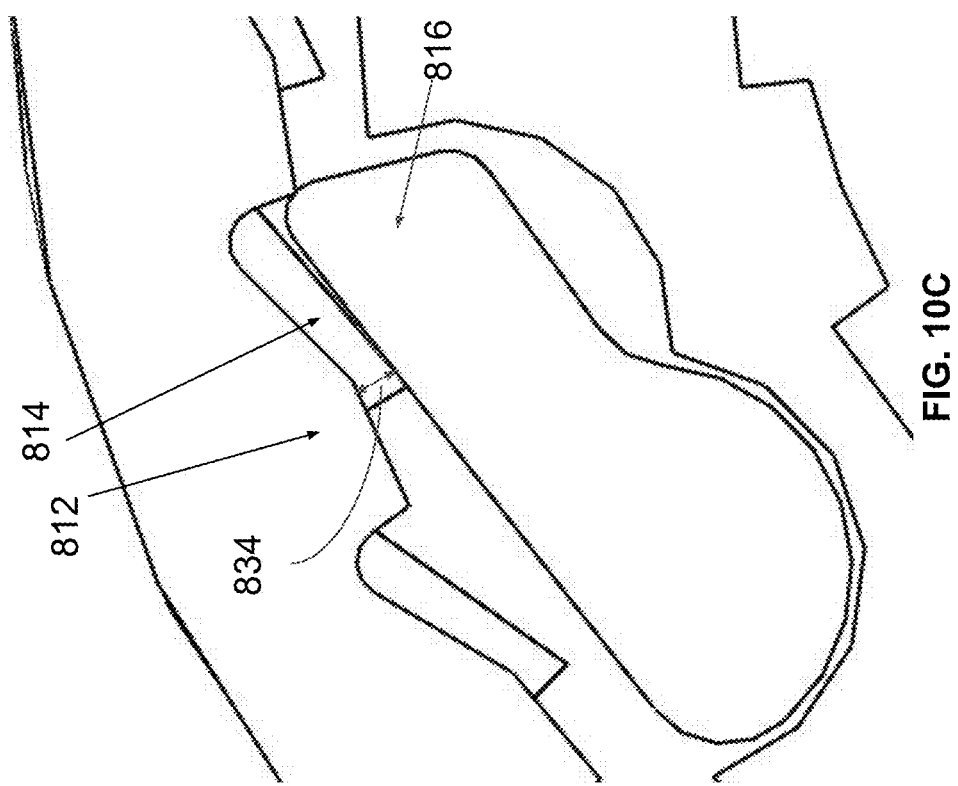

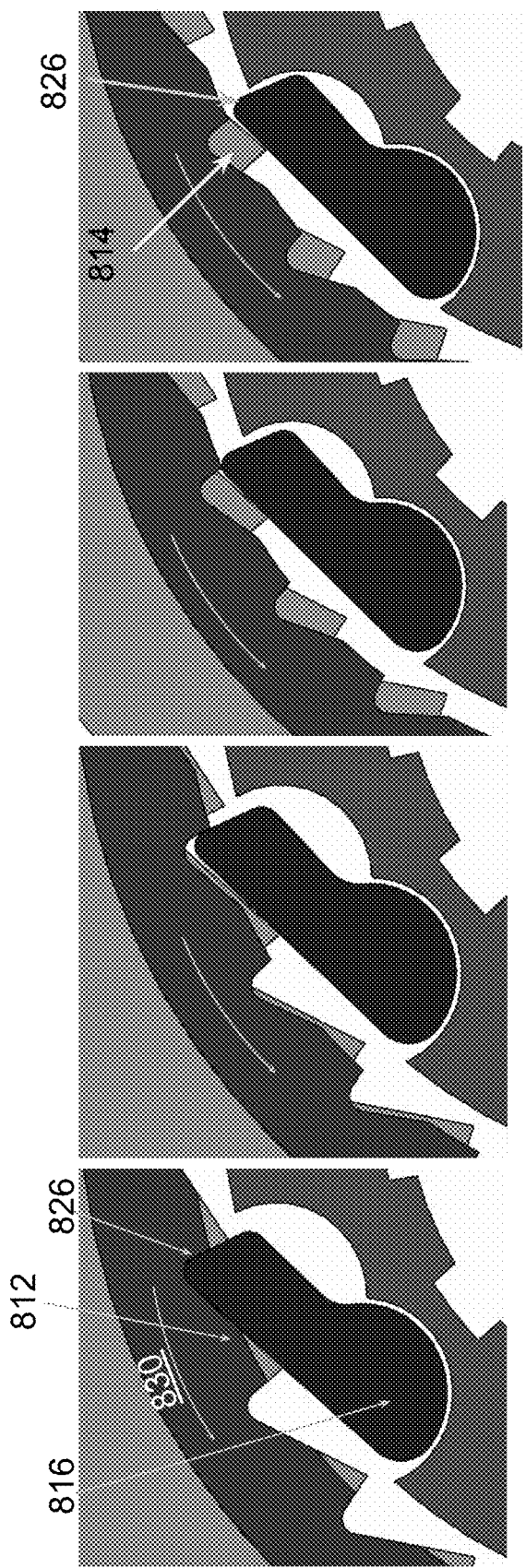

MID-DRIVE E-BIKE

TECHNICAL FIELD

The present disclosure generally relates to a system that enables regenerative braking for mid-drive e-bikes, and more specifically to a mid-drive e-bike system that is compatible with standard derailleur gearing systems and standard e-bike geometries including full suspension frames.

BACKGROUND

A derailleur gearing system is the most common type of gearing system for regular bicycles as well as electric bicycles, also known as e-bikes.

Current mid-drive e-bikes, in which the motor is positioned in between the pedals, are typically equipped with a derailleur gearing system. Such a derailleur gearing system is not capable of providing regenerative braking.

Derailleur based transmission systems operate by delivering torque via the top side of the bicycle chain and handling chain slack at the bottom side of the chain by the derailleur, which acts as a chain tensioner. Thus, when the crankset is rotated in the forward direction, by either the mid-drive motor or the e-bike rider via pedal rotation, the chain is pulled at its top side, which in turn pulls on the rear bike wheel thereby moving the e-bike forward, while the bottom side chain slack is kept tight by the derailleur.

Braking by resisting the forward motion of the crankset is inherently not possible on e-bikes or any bicycle equipped with derailleur transmission, since resisting crankset forward motion implies applying tension on the bottom side of the chain, which may damage the derailleur and may generate slack on the top side of the chain thereby causing the chain to jam or derail. On all derailleur equipped bicycles, a freewheel must be mounted on the rear hub to allow the chain to rest when coasting and thus prevent the rider from braking by halting the pedals. Hence, on contemporary e-bikes, a mid-drive motor, which is a motor mounted on the crankset, is not useful for braking.

Therefore, there is the need for a system that would enable regenerative braking via a mid-drive e-bike, which is equipped with a standard derailleur system. That is, preferably, the system that would enable regenerative braking should be compatible with current and standard derailleur gearing systems, such to avoid the need for implementing significant changes to standard mid-drive e-bikes.

SUMMARY

The present disclosure provides a system for a mid-drive e-bike that includes a rear hub configured to enable regenerative braking by causing backwards rotation of the chain sprocket, which is impossible with standard mid-drive e-bikes. Preferably, the system may further include a crankset that is arranged to prevent the e-bike's pedals from rotating in a backwards direction due to the backwards rotation of the chain sprocket, which enables regenerative braking.

According to embodiments of the disclosure, there is provided a powertrain of a mid-drive electric bicycle for regenerative braking. The powertrain comprising: a mid-drive electric motor, a chain rotatably connected to the mid-drive electric motor, a gearing system mounted in a rear wheel hub, the gearing system is rotatably connected to the chain, and a mechanical brake connected to a component of the gearing system. In some embodiments, during driving mode, the mid-drive electric motor and the chain rotate in a forward driving direction. In some embodiments, during operation of the mechanical brake, the gearing system is configured to cause rotation of the chain in a backward direction opposite to the forward driving direction, which mechanically forces the mid-drive electric motor to rotate in the backward direction, to thereby regenerate electric energy.

In some embodiments, the mid-drive electric bicycle is compatible with a transmission that allows tension of the chain only on a top side of the chain as in a standard derailleur gearing system.

In some embodiments, the gearing system is a gearing system with two-degrees-of-freedom comprising at least three components configured to rotate with respect to one another, said gearing system configured to transfer power from the chain to a rear wheel of the mid-drive electric bicycle.

Optionally, in coasting mode, the two-degrees-of-freedom of the gearing system allow the chain to rest while the rear wheel is rotating in the forward driving direction. Optionally, in driving mode, one degree of freedom of the gearing system is fully reduced by operation of a one-way mechanism, forcing rotation of the rear wheel in the forward driving direction by forward rotation of the chain. In some embodiments, in braking mode, one degree of freedom of the gearing system is gradually reduced by operation of the mechanical brake, forcing backward rotation of the chain by rotation of the rear wheel in the forward driving direction.

In some embodiments, the gearing system comprises a planetary gear, the planetary gear comprising a sun gear, at least one planet gear, a planet carrier and a ring gear. In some embodiments, the sun gear is rotatably connected to the chain, the ring gear is rotatably connected to the rear wheel, and the planet carrier is rotatably connected to the mechanical brake.

In some embodiments, the one-way mechanism is configured to restrict rotation of the ring gear in the forward driving direction with respect to rotation of the sun gear such that speed of the ring gear is equal or larger than speed of the sun gear (Tr≥Ts); or the one-way mechanism is configured to restrict rotation of the planet carrier in the forward driving direction with respect to rotation of the sun gear such that speed of the planet carrier is equal or larger than speed of the sun gear (Tc≥Ts).

In some embodiments, speed ratio between sun gear and ring gear is 1:1 in driving mode, wherein ratio between number of teeth of the sun gear and number of teeth of the ring gear determines speed ratio between sun gear and ring gear in braking mode alone, and wherein ratio between number of teeth of the sun gear and number of teeth of the ring gear is 1:1, the speed ratio between sun gear and ring gear in 1:1 in braking mode and in driving mode.

In some embodiments, the mechanical brake comprises a disc brake.

In some embodiments, the powertrain comprises a crankset configured to prevent rotation of pedals of the electric bicycle in a backwards driving direction during backwards rotation of the chain in braking mode.

In some embodiments, the crankset comprises a self-canceling overrunning clutch that operates to disengage the pedals from the chain by backwards rotation of the chain vs. a chassis of the mid-drive electric bicycle.

In some embodiments, the crankset comprises: a chainring ratchet connected to a chainring, onto which the chain is rotated; a canceler ratchet that is restricted to rotate in the direction of forward driving and not to rotate in the backward direction; and a pedal pawl element onto which the pedals of the mid-drive electric bicycle are fastened.

In some embodiments, when the pedals are rotated in forward driving direction, the pedal pawl element is configured to engage with the chainring ratchet and the canceler ratchet to thereby force the chainring ratchet and the canceler ratchet to rotate in the forward driving direction.

In some embodiments, when the pedals are moved in backward direction, the chainring ratchet and the canceler ratchet are in rest state.

In some embodiments, when the chain is moved in forward driving direction by the mid-drive electric motor, the chainring ratchet is rotated in forward driving direction while the pedals and the canceler ratchet are in rest state.

In some embodiments, when the chain is moved in the backward direction by the gearing system of the rear wheel hub during braking, the chainring ratchet rotates in the backward direction, while the canceler ratchet that is restricted from rotating in the backward direction and is thus in rest state, causes the pedal pawl element to be in rest state and thus prevents the pedals from rotating in the backward direction.

In some embodiments, width and position of the pedal pawl element with respect to the chainring ratchet and the canceler ratchet enable the pedal pawl element to interact with both the chainring ratchet and the canceler ratchet.

In some embodiments, the pedal pawl element comprises at least one pawl, the canceler ratchet comprises at least one canceler tooth and the chainring comprises at least one chainring tooth, wherein width of the pawl is larger than width of each of the at least one canceler tooth and the at least one chainring tooth, and further wherein the at least one canceler tooth is protruding inwards more than the at least one chain-ring tooth.

In some embodiments, when the chainring rotates in the backwards driving direction, the at least one canceler tooth of the canceler ratchet that is in rest state, presses against each of the at least one pawl of the pedal pawl element causing each of the at least one pawl to retract, thereby disengaging the pedal pawl element from the chainring ratchet, which causes the pedal pawl element to cease its rotation while enabling free rotation of the chainring in the backwards driving direction, during braking mode.

In some embodiments, rotation of the canceler ratchet is restricted with respect to a chassis of the mid-drive electric bicycle by a one-way clutch.

The present disclosure further comprises a mid-drive electric bicycle gearing system comprising: a mid-drive electric motor; a chain rotatably connected to the mid-drive electric motor; a cassette comprising a cassette sprocket: a gearing system mounted in a rear wheel hub, the gearing system is rotatably connected to the chain via the cassette; a mechanical brake connected to a component of the gearing system, said mechanical brake comprising a disc brake, wherein during driving mode the mid-drive electric motor and the chain rotate in a forward driving direction; and wherein during operation of the mechanical brake, the gearing system is configured to cause rotation of the chain in a backward direction opposite to the forward driving direction, which mechanically forces the mid-drive electric motor to rotate in the backward direction, to thereby regenerate electric energy. The mid-drive electric bicycle gearing system may further comprise a control system configured to control an amount of power supplied by the mid-drive electric motor during the driving mode, and to control an amount of negative braking torque applied by the mid-drive electric motor during the regenerative braking mode.

In some embodiments, the control system comprises a processor configured to: predefine a set point value; calculate a process value; and determine an amount of negative braking torque required for equality between the process value and the set point value.

In some embodiments, the process value is based on speed of the cassette sprocket, and wherein the set point value is based on: (i) speed of the rear wheel. (ii) transmission ratio of the gearing system and (iii) a parameter modifiable according to required regeneration ratio.

In some embodiments, the required regeneration ratio is determined by at least one of: battery/capacitor state of charge (SOC), power ratings, driving speed, motor load, terrain, temperature, or any combination thereof.

In some embodiments, the mid-drive electric bicycle gearing system further comprises a cassette speed sensor and a disc brake speed sensor, wherein the speed of the rear wheel is calculated based on disc brake speed that is measured by disc brake speed sensor and based on speed of the cassette sprocket that is measured by cassette speed sensor.

In some embodiments, the process value is based on speed of the disc brake, and wherein the set point value is a fixed non-zero low speed.

In some embodiments, the mid-drive electric bicycle gearing system further comprises:
(i) a motor speed sensor to measure motor speed.
(ii) a low resolution rear wheel speed sensor to measure approximate rear wheel speed; and
(iii) a disc brake speed sensor.

In some embodiments, a selected cassette sprocket gear ratio is calculated based on the approximate rear wheel speed and the motor speed, the speed of the cassette sprocket is calculated based on the motor speed and the selected cassette sprocket gear ratio, and speed of the rear wheel is calculated based on disc brake speed that is measured by disc brake speed sensor and based on said calculated speed of the cassette sprocket.

BRIEF DESCRIPTION OF THE DRAWINGS

Some non-limiting exemplary embodiments or features of the disclosed subject matter are illustrated in the following drawings.

In the Drawings:

FIGS. 3-3B are schematic illustrations of a longitudinal cross-section of a rear wheel hub, a cross-section of the rear wheel hub illustrating a planetary gear incorporated within the rear wheel hub, and a cross-section of a one-way clutch positioned between the cassette and the rear wheel, respectively, according to embodiments of the present disclosure;

FIGS. 7-7C, which are schematic illustrations of a side view of a rear wheel with a disc brake speed sensor and a cassette speed sensor, a front view of a disc brake speed sensor, a front view of a cassette speed sensor and a front perspective view of a rear wheel speed sensor, respectively, according to embodiments of the present disclosure;

FIGS. 10A-10B are schematic illustrations of perspective views of a chainring ratchet and a canceler ratchet, according to embodiments of the present disclosure;

FIG. 10C schematically illustrates an enlarged view of a pedal pawl with respect to a chainring ratchet tooth, and a canceler tooth, according to embodiments of the present disclosure;

FIGS. 11A-11D are schematic illustrations of the a pawl as it is pushed first by a chainring ratchet tooth and finally retracted by a canceler tooth, during backwards rotation of the chainring, according to embodiments of the present disclosure;

Figure 1:
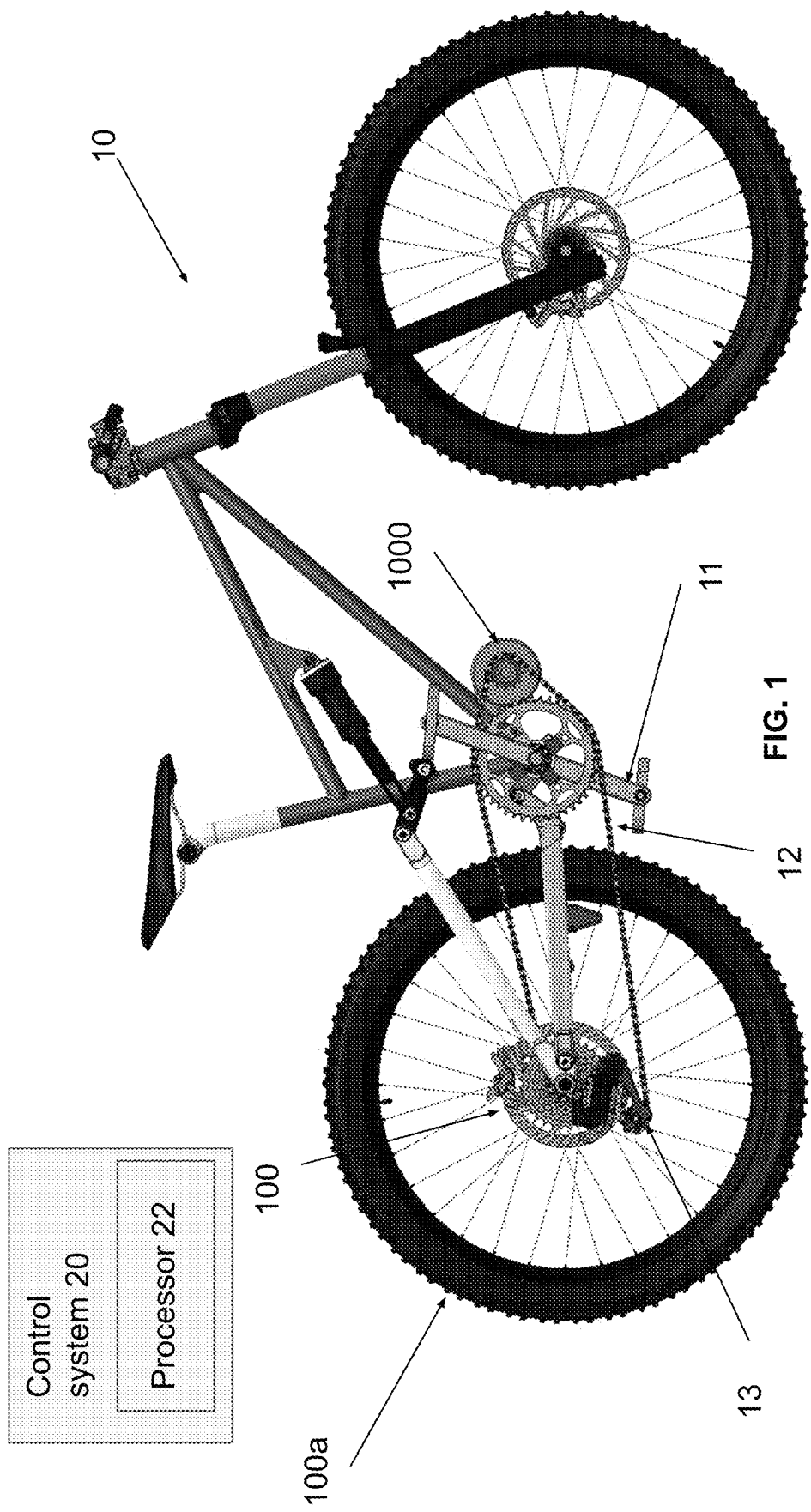
FIG. 1 is a schematic illustration of a mid-drive e-bike, according to embodiments of the present disclosure.

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspectives or from different point of views.

DETAILED DESCRIPTION

The present disclosure provides a system for a mid-drive e-bike, the system comprising a rear hub that is arranged in such a way that under braking conditions the direction of chain rotation is reversed. Thus, when braking, the forward motion of the rear wheel translates to backwards motion of the chain sprocket, thereby pulling the chain only on the top side of the chain, as is compatible with and dictated by the derailleur system topology, which allows tension of the chain only on a top side. Accordingly, the present disclosure provides a rear hub that enables regenerative braking via standard mid-drive e-bikes that comprise standard derailleur gearing systems.

The system of the present disclosure further provides a crankset that is arranged in such a way that when the chain is pulled backwards by the rear hub of the present disclosure, the pedals remain idle and unaffected, to prevent backwards pedal rotation due to backwards motion of the chain sprocket.

In standard contemporary mid-drive e-bikes, the operating requirements of the powertrain comprise the following:
(a) Motor one-way clutch-forward motor motion applies driving torque, and backwards motor motion is free, thus motor may remain idle when the e-bike is moving forward either by inertia, e.g., during coasting, or by (manual) pedal power;
(b) Rear wheel freewheel (rear hub)—forward chain motion applies driving torque on the rear wheel, and rear wheel is configured to support forward coasting mode such that the chain can remain idle when the rear wheel is moving forward by inertia; and
(c) Pedals one-way clutch (crankset)—forward pedal motion applies driving torque, backwards pedal motion is free, thus pedals may remain idle when the crankset is moving forward by motor power.

The following are additional requirements from the powertrain to enable regenerative braking, and which are implemented by the powertrain of the present disclosure:
(a) Motor one-way clutch—the motor is additionally required to be able to provide braking torque when the motor is being pulled backwards, i.e., the motor is to resist its backwards motion, which implies that braking torque direction is forward, similarly to driving torque direction. That is, the motor applies forward torque during driving as well as during braking, while during driving the motor rotates in the forward driving direction, and during braking the motor is forced to rotate in the opposite backwards driving direction. This requirement is met by the contemporary motor one-way clutch gearing system without the need for any mechanical modification (see mid-drive electric motor 1000 and motor one-way clutch 1103, schematically illustrated in FIG. 10);
(b) Rear wheel freewheel—the rear wheel is additionally required to support braking function by pulling the chain and causing it to rotate backwards, when the brakes are applied in a continuous and variable manner. Backwards rotation of the chain during braking, will enable the e-bike to experience regenerative braking, while not interfering with the derailleur's operation. This requirement is not being met by current Rear wheel freewheel and thus requires a unique rear hub as provided by the present disclosure; and
(c) Pedals one-way clutch-pedals are additionally required to be able to remain idle and not rotate backwards when the chain is rotating backwards, to avoid any inconvenience to the rider of the mid-drive e-bike. This requirement is not being met by current pedals' one-way clutch and requires a unique new crankset assembly as provided by the present disclosure.

According to the present disclosure, in order to enable regenerative braking by contemporary standard mid-drive e-bikes, which comprise a standard derailleur, during braking mode, the rear wheel should enable pulling of the chain in the backwards direction (opposite the driving direction) from its top side and not allow the chain to rest as would occur in standard derailleur gearing systems. Pulling the chain to rotate backwards causes the mid-drive electric motor to rotate backwards, while the motor applies torque in the forward driving direction. Accordingly, regenerative braking is enabled, since regenerative torque is negative torque. i.e., torque that is applied in an opposite direction to the direction of motion. During coasting mode, the chain would be allowed to rest, as in contemporary standard mid-drive e-bikes with a standard derailleur.

Accordingly, the present disclosure provides a unique Rear Hub, which is part of a powertrain of a mid-drive e-bike, to enable regenerative braking. The powertrain may comprise a mid-drive electric motor and a chain or belt rotatably connected to the mid-drive electric motor. The powertrain may further comprise a gearing system mounted in a rear wheel hub, the gearing system may be rotatably connected to the chain. In some embodiments, the powertrain may comprise a standard derailleur and cassette transmission. The powertrain may further comprise a mechanical brake connected to a component of the gearing system.

According to some embodiments, during driving mode, the mid-drive electric motor and the chain may rotate in a forward driving direction; and during operation of the mechanical brake, the gearing system in the rear wheel hub may be configured to cause rotation of the chain in a backward direction opposite to the forward driving direction. Rotation of the chain in the backwards direction mechanically forces the mid-drive electric motor to rotate in the backward direction while applying torque in the forward driving direction, thereby to regenerate electric energy.

Reference is now made to FIG. 1, which is a schematic illustration of a mid-drive e-bike, according to embodiments of the present disclosure. Mid-drive e-bike 10 comprises pedals 11, and an electric motor 1000 located in between pedals 11. Accordingly, mid-drive e-bike 10 may be moved forward either via manual forward rotation of pedals 11, e.g., by a rider, or via forward rotation of electric motor 1000. In both cases, forward rotation of the pedals or of the electric motor 1000, causes rotation of chain or belt 12, which comprise a derailleur 13. In some embodiments, mid-drive e-bike 10 may comprise a rear wheel hub 100, which may enable regenerative braking, as will be explained hereinbelow in detail.

In some embodiments, mid-drive e-bike 10 may comprise a control system 20, which is configured to control operation of electric motor 1000 during the various operational modes of rear wheel bub 100. In some embodiments, control system 20 may comprise a processor 22, which is configured to determine the amount of negative torque that may be applied by electric motor 1000 during the regenerative braking mode.

According to some embodiments, control system 20 may be configured to receive various input data, typically speed related, e.g., the speed of electric motor 1000, the speed of rear wheel 100*a*, speed of any other component of the gearing system or of any component of the mechanical friction brake system, and/or any combination thereof. In some embodiments, the input received by control system 20, may be received from different sensors that may be connected to different elements of rear wheel hub 100. The received input may be analyzed by at least one processor 22 that may be incorporated as part of control system 20, according to a braking mode control algorithm, which will be described hereinbelow with respect to FIG. 6.

Figure 2A:
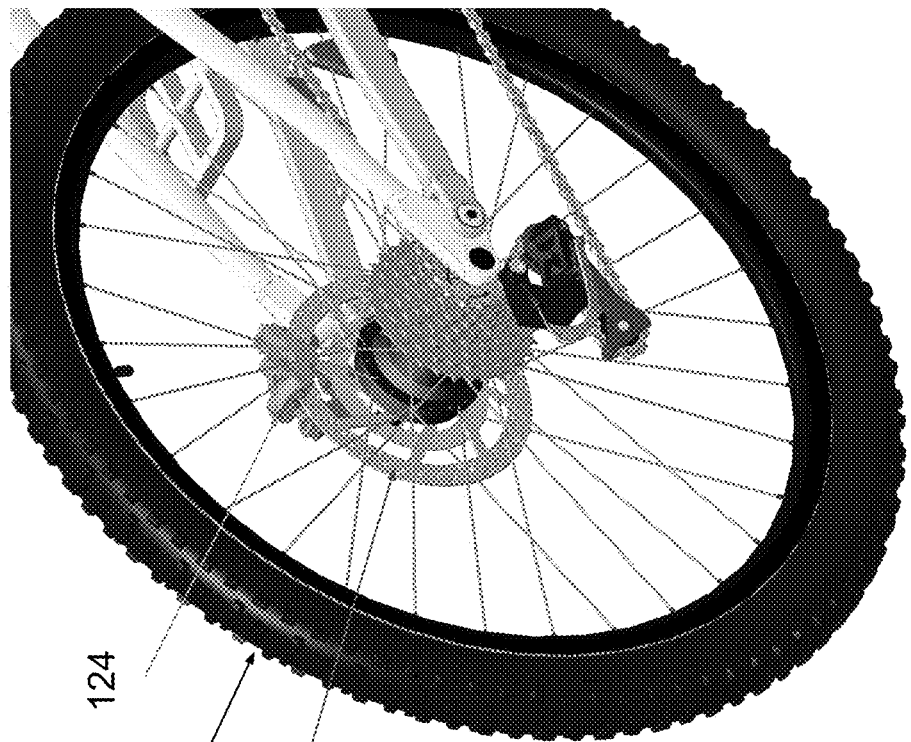
FIGS. 2A-2B are schematic illustrations of the rear wheel hub, in perspective and side view, respectively, according to embodiments of the present disclosure.
Figure 2B:
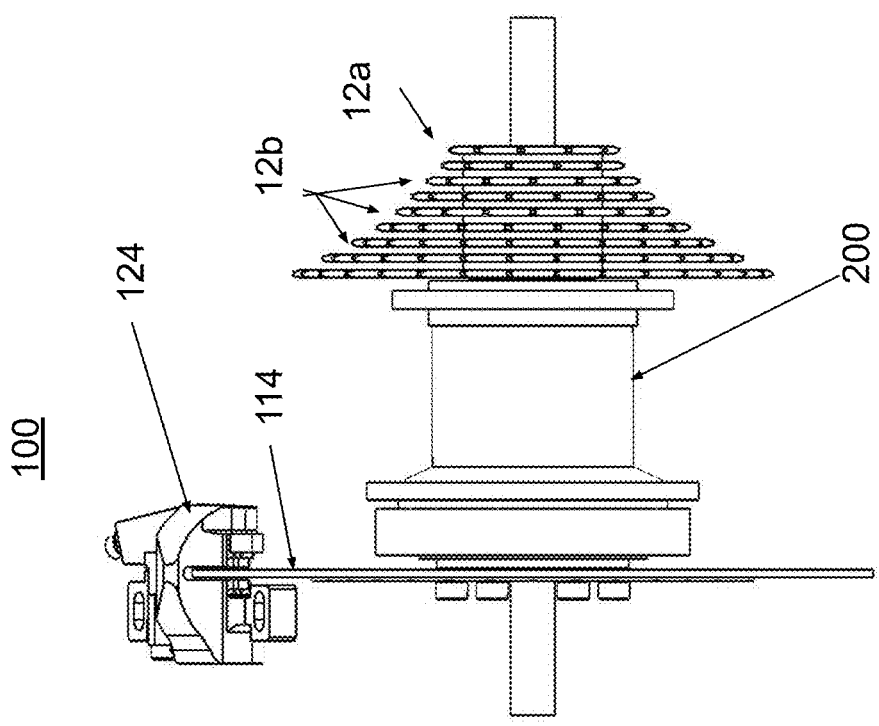

FIGS. 2A-2B are schematic illustrations of the rear wheel hub 100, in perspective and side view, respectively, according to embodiments of the present disclosure. As illustrated in FIGS. 2A-2B, rear wheel hub 100 may comprise a gearing system 200 that is rotatably connected to chain 12 via cassette 12*a*. Cassette 12*a* may comprise a plurality of cassette sprockets 12*b*. In some embodiments, gearing system 200 is further rotatably connected to a mechanical brake, which may comprise a disc brake 114 and optionally a caliper 124. FIG. 2A illustrates the position of the gearing system 200 as well as of cassette 12*a* and of the mechanical brake system 114, 124, with respect to rear wheel 100*a*.

Reference is now made to FIGS. 3-3B, which are schematic illustrations of a longitudinal cross-section of a rear wheel hub, a cross-section of the rear wheel hub illustrating a planetary gear incorporated within the rear wheel hub, and a cross-section of a one-way clutch positioned between the cassette and the rear wheel, respectively, according to embodiments of the present disclosure. In some embodiments, rear wheel hub 100 may comprise a gearing system 200, which may be a gearing system with two-degrees-of-freedom. The gearing system 200 may comprise at least three components configured to rotate with respect to one another, and the gearing system 200 may be configured to transfer torque from the chain 12 via cassette 12*a* to the rear wheel 100*a*. Optionally, the gearing system 200 may comprise a planetary gear. In some embodiments, the planetary gear may comprise a sun gear 101, at least one planet gear 102, a planet carrier 122 and a ring gear 105, which rotates with respect to chassis 107. The sun gear 101 may be rotatably connected to the chain 12 via cassette 12*a*. The ring gear 105 may be connected to the rear wheel 100*a* (FIG. 1), and the planet carrier 122 may be connected to a mechanical brake. The mechanical brake may be a mechanical friction brake system and may comprise a disc brake 114 and a caliper 124.

In some embodiments, the two-degrees-of-freedom of the gearing system may comprise a one-way mechanism 103, which is configured to reduce one degree of freedom of the gearing system. As illustrated in FIG. 3B, one-way mechanism 103 may be a one-way bearing. One-way mechanism 103 may be connected to ring gear 105, such that ring gear 105 may rotate along the one-way mechanism 103 with respect to the sun gear 101. One-way mechanism 103 may dictate the speed of rotation of ring gear 105 in the forward driving direction with respect to speed of rotation of the sun gear 101, such that the speed of ring gear (represented by 'Tr') 105 is equal to or larger than the speed of the sun gear 101 (represented by 'Ts'), thereby obeying: Tr≥Ts. That is, when sun gear 101 rotates in the forward direction, indicated by arrow 300, ring gear 105 is forced, by one-way mechanism 103, to rotate in the forward direction at the same or larger speed than that of sun gear 101. One-way mechanism 103 allows sun gear 101 to rest when ring gear 105 rotates due to inertia, as in coasting mode, thereby maintaining the speed restriction of ring gear 105 with respect to sun gear 101 (Tr≥Ts).

In some embodiments, in coasting mode, the gearing system 200 may allow sun gear 101 or chain 12 to rest, while the rear wheel 100*a* is rotating in the forward driving direction due to inertia. In driving mode, one degree of freedom of the gearing system 200 is fully reduced by operation of the one-way mechanism 103, forcing rotation of the rear wheel 100a via ring gear 105 in the forward driving direction, by forward rotation of chain 12. In braking mode, one degree of freedom of the gearing system 200 is gradually reduced by operation of the mechanical brake system, e.g. disc brake 114 and caliper 124, forcing backward rotation of chain 12 while rotation of the rear wheel 100a via ring gear 105 is in the forward driving direction, as dictated by gearing system with two-degrees of freedom.

During braking mode, rotation of the planet carrier 122 is restricted by the mechanical brake, e.g., by friction disc brake 114, since the friction brake 114 is operated during braking mode, by the user, and is connected to the planet carrier 122. Thus, since planet carrier 122 is restricted from rotating, ring gear 105 may rotate planet gears 102, which may in turn rotate sun gear 101, in the opposite direction to the rotation direction of ring gear 105, thus not violating speed restriction of ring gear 105 with respect to sun gear 101 (Tr≥Ts) that is imposed by the one-way bearing 103. Causing sun gear 101, which is equivalent to forcing chain 12, to rotate by mechanical force instead of by electric power, while electric motor 1000 applies negative torque, enables the mid-drive e-bike, e.g., mid-drive e-bike 10, to regenerate energy during braking mode.

Figure 4A:
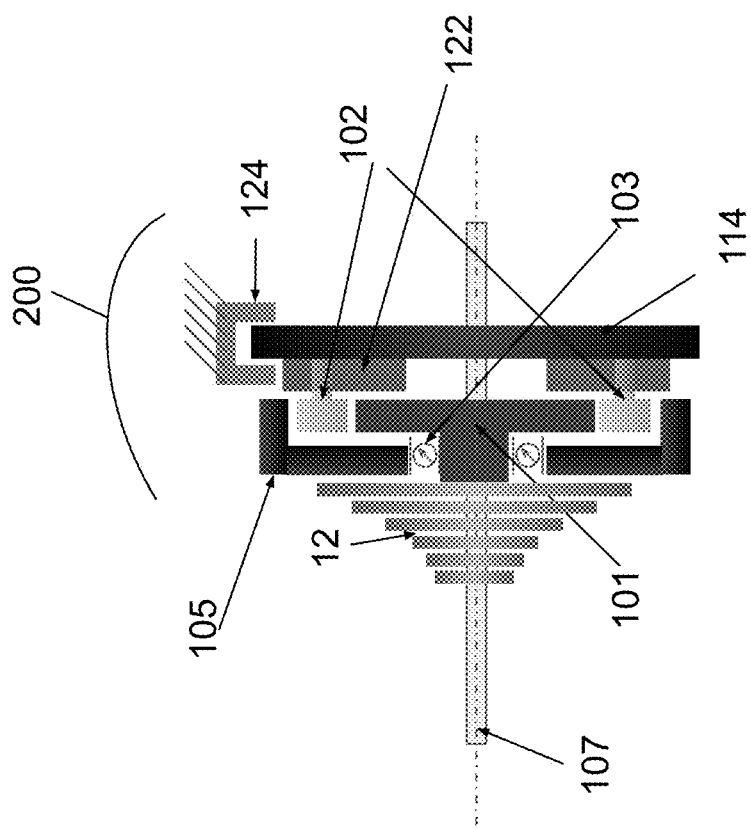
FIGS. 4A-4B are schematic illustrations of two examples of a rear wheel hub, according to embodiments of the present disclosure.
Figure 4B:
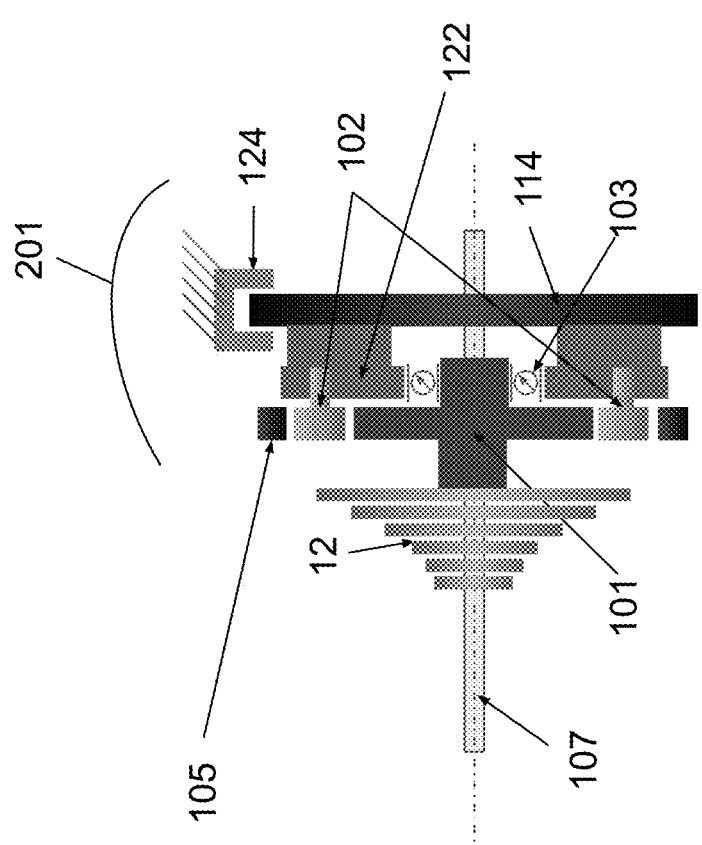

Reference is now made to FIGS. 4A-4B, which are schematic illustrations of two examples of a rear wheel hub, according to embodiments of the present disclosure. FIG. 4A schematically illustrates the embodiment illustrated in FIGS. 2A-2B, and 3-3A, in which the one-way mechanism 103 is located between sun gear 101 and ring gear 105. Whereas FIG. 4B schematically illustrates a rear hub in which the one-way mechanism is located between sun gear 101 and planet carrier 122.

According to some embodiments, as illustrated in FIG. 4B, one-way mechanism 103 is configured to dictate rotation of planet carrier 122 with respect to rotation of sun gear 101, specifically during driving mode.

In some embodiments, in coasting mode, gearing system 201 may allow sun gear 101 or chain 12 to rest, while the rear wheel 100a is rotating in the forward driving direction due to inertia. In driving mode, one degree of freedom of the gearing system 201 is fully reduced by operation of the one-way mechanism 103, forcing rotation of planet carrier 122, by forward rotation of sun 101 or chain 12. Rotation of planet carrier 122 causes the rear wheel 100a via ring gear 105 to rotate in the forward driving direction, as does sun gear 101 rotate. In braking mode, one degree of freedom of the gearing system 201 is gradually reduced by operation of the mechanical brake system, e.g., disc brake 114 and caliper 124, forcing backward rotation of chain 12 while rotation of the rear wheel 100a via ring gear 105 is in the forward driving direction, as dictated by gearing systems with two-degrees of freedom.

During braking mode, rotation of the planet carrier 122 is restricted by the mechanical brake, e.g., by friction disc brake 114, since the friction brake 114 is operated during braking mode, by the user, and is connected to the planet carrier 122. Thus, since planet carrier 122 is restricted from rotating, ring gear 105 may rotate planet gears 102, which may in turn rotate sun gear 101, in the opposite direction to the rotation direction of ring gear 105. Thus, not violating the speed restriction between speed of planet carrier 122 (represented by 'Tc') and speed of sun gear 101 (represented by 'Ts'), thereby obeying: Tc≥Ts, which is imposed by the one-way bearing 103. Causing sun gear 101, which is equivalent to forcing chain 12, to rotate by mechanical force instead of by electric power, while electric motor 1000 applies negative torque, enables the mid-drive e-bike that implemented gearing system 201, to regenerate energy during braking mode.

Figure 5A:
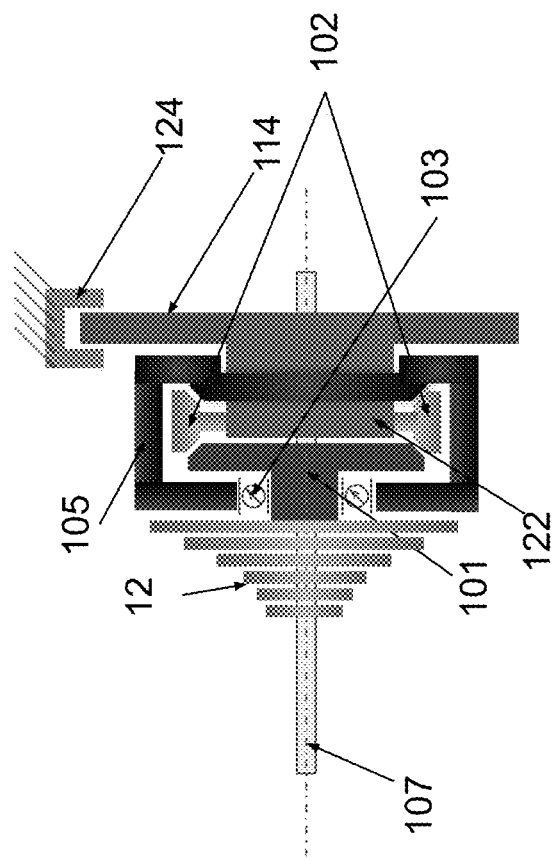
FIGS. 5A-5B are schematic illustrations of additional two examples of a rear wheel hub, according to embodiments of the present disclosure.
Figure 5B:
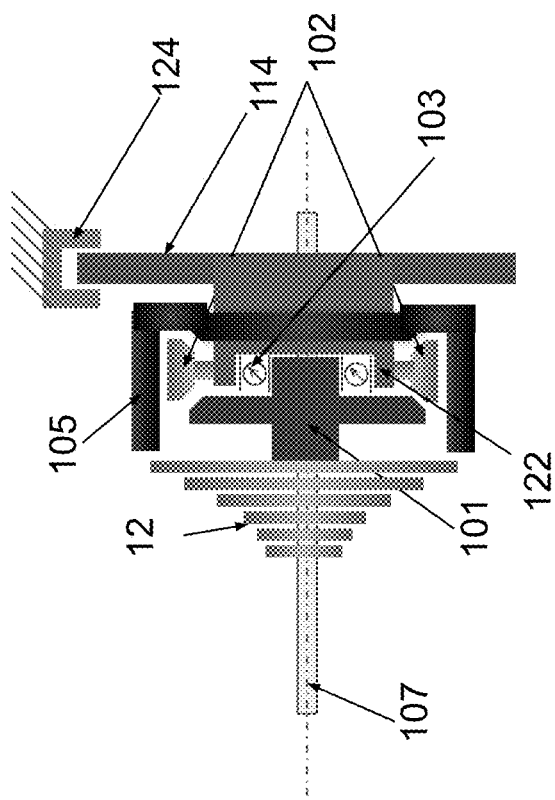

Reference is now made to FIGS. 5A-5B, which are schematic illustrations of additional two examples of a rear wheel hub, according to embodiments of the present disclosure. According to some embodiments, each of FIGS. 5A-5B schematically illustrates a rear hub implementing differential gear topology. The differential gear topology of FIG. 5A is equivalent to the planetary gear topology of FIG. 4A, and the differential gear topology of FIG. 5B is equivalent to the planetary gear topology of FIG. 4B.

According to some embodiments, the ratio between the number of teeth of sun gear 101 to the number of teeth of ring gear teeth may determine the ratio of RPM of cassette 12a vs. RPM of rear wheel 100a (or ring gear 105) in braking mode alone. That is since in driving mode the ratio is always 1:1, as the ratio between RPM of sun gear 101 and ring gear 105 is dictated by the one-way mechanism 103, and not by the number of teeth of each of these gears. This ratio between RPM of cassette 12a vs. RPM of ring gear 105 may be used to implement a transmission where the maximum available braking torque is different from, e.g., higher or lower than the maximum available driving torque. A case where the number of Sun gear teeth equals the number of Ring gear teeth conforms with a differential topology. Thus, per differential topology (FIGS. 5A-5B) the ratio between RPM of cassette 12a vs. RPM of rear wheel 100a (or ring gear 105) will be 1:1 in braking mode, as well as in driving mode.

Figure 6:
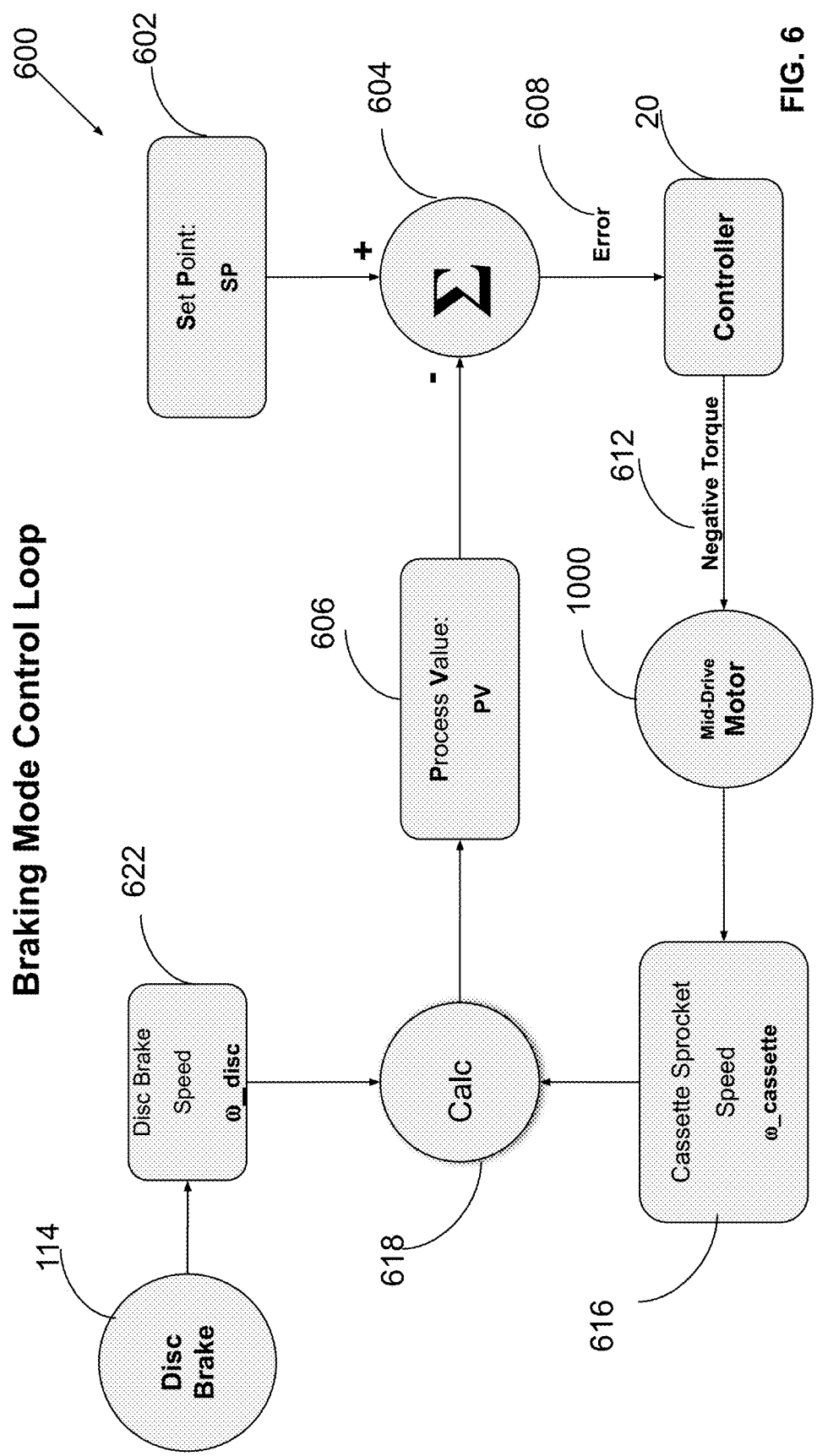
FIG. 6 is a schematic illustration of a braking mode control algorithm, according to embodiments of the present disclosure.

Reference is now made to FIG. 6, which is a schematic illustration of a braking mode control algorithm, according to embodiments of the present disclosure. According to embodiments of the present disclosure, the amount of negative torque that is to be applied by electric motor 1000 in a continuous manner, in order to provide a smooth braking motion, may be determined by control system 20, e.g., via processor 22, according to braking mode control algorithm 600.

In some embodiments, braking mode control algorithm 600 may be a feedback loop. Braking mode control algorithm 600 may comprise calculating a loop Process-Value (PV) 606, as well as a Set Point (SP) value 602. The calculating may be done via control system 20 and/or processor 22.

In some embodiments, PV may represent the speed of cassette sprocket 12b (FIG. 2B), which may be calculated according to equation (1):

$$PV = \omega\_cassette \quad (1)$$

whereby:

ω_cassette denotes cassette sprocket speed.

In some embodiments, braking mode control algorithm 600 may comprise setting a loop Set-Point (SP) ratio 602, which may have a value calculated according to equation (2):

$$SP = \omega\_wheel \times Gear\ Ratio \times Regen \quad (2)$$

whereby:

ω_wheel denotes rear wheel speed; and

Regen denotes a parameter with a value smaller than 1, which represents the regeneration ratio, which is explained in detail hereinbelow; and Gear Ratio denotes the transmission ratio of the hub gearing system with two-degrees of freedom, i.e., -R/S according to (3).

$$(R + S) \times Tc = R \times Tr + Ts \times S \quad (3)$$

whereby:
R denotes no. of Ring gear teeth;
S denotes no. of Sun gear teeth;
Tc denotes no. of turns of the planet carrier, i.e., the disc brake Speed $\omega\_disc$;
Tr denotes no. of turns of the ring gear, i.e. the rear wheel speed $\omega\_wheel$; and
Ts denotes no. of turns of the sun gear, i.e. the cassette speed $\omega\_cassette$;

According to some embodiments, when 'Regen' has a value near '1', this indicates that most of the kinetic energy will be regenerated by the electric motor 1000, while when 'Regen' has a value near '0', this indicates that most of the kinetic energy will be dissipated as heat by the mechanical braking system, e.g., disc brake 114 (and caliper 124).

In some embodiments, in order to provide an energy efficient gearing system, 'Regen' should be a number as close as possible to 1, though smaller than 1.

In some embodiments, the energy regenerated by electric motor 1000 may be stored in an energy storage device such as a battery or a capacitor. When said storage device reaches or is about to reach its maximum capacity, or when the regenerative power is close to the maximum rating dictated by the manufacturer of either of the components of the electrical system, 'Regen' can be set to a low value, thus minimizing regenerative braking power and maximizing mechanical braking power. That is, in some embodiments, 'Regen' may be changed or modified during operation of the vehicle to conform to various system restrictions, by control system 20, e.g., via processor 22.

In some embodiments, 'Regen' may be a parameter modifiable according to required regeneration ratio, which may be changed by control system 20 based on battery/capacitor state of charge (SOC), power ratings, driving speed, motor load, terrain, temperature, or any combination thereof. Other and/or additional parameters may affect 'Regen'.

The control system 20, e.g., via processor 22, in effect 'mirrors' the mechanical torque applied on the disc brake by the user, to electrical torque applied by the motor, so the torque on both the motor and disc are controlled to be equal. The 'Regen' parameter defines only where the energy is going. If 'Regen' is high, i.e., closer to '1', it implies that the motor speed is high and most of the energy goes to the motor, thereby being more regenerative. If 'Regen' is low. i.e., closer to '0', it implies that the disc brake speed ($\omega\_disc$) is high and most of the energy goes to the disc brake, thereby being more dissipating. Either way, whether 'Regen' is high or low, the braking torque is determined only by the amount of pressure the user applies on the brake handle.

In some embodiments, braking mode control algorithm 600 may comprise calculating 604, by controller 20, an error 608 by a subtraction of the Process Value (PV) 606 from the Set Point (SP) 602. Based on error 608, controller 20 may control the amount of negative torque 612 applied by the electric motor, e.g., electric motor 1000, in order to achieve equality between the SP ratio and the PV ratio, resulting in error 608 being equal to zero.

The amount of negative torque applied by the electric motor, e.g., electric motor 1000, is proportional to the negative error 608. The greater negative error 608 is, the more negative torque is applied by the electric motor. In case error 608 is positive. i.e., that the absolute value of PV 606 is smaller than the absolute value of the SP 602, no negative torque would be applied but neither would positive torque be applied. That is, the maximum positive torque defined by control system 20 during braking mode is '0', since during braking mode only negative torque should be applied by the electric motor, to slow down the e-bike while regenerating energy.

In some embodiments, the more brake pressure is applied by a user, the more the speed of planet carrier 122 is reduced. The reduction in speed of planet carrier 122 may be reflected as an increase in PV 606, since cassette speed 616 increases when planet carrier speed is reduced. In response, controller 20 may increase negative torque onto electric motor 1000, thereby increasing braking force in order to reduce the PV value and achieve equality between the PV value and the SP value.

On the contrary, the less brake pressure applied by the user, the less the speed of planet carrier 122 is reduced. The less the speed of planet carrier 122 is reduced, may be reflected as a reduced PV value, which may cause controller 20 to reduce negative torque onto electric motor 1000, thereby to reduce braking force.

For example, following equation (3), the rear wheel hub 100 with gearing system 200 may implement a no. of Sun gear teeth: S=16; and no. of Ring gear teeth: R=24.

Implementing a reduction ratio of '~1.5', Gear=−1.5.

Optionally, coasting may be at 200 RPM, i.e., $\omega\_wheel$=200.

Since the mode of operation is coasting, the cassette stands still and does not rotate, hence: $\omega\_cassette$=0.

Accordingly, following equation (3), for a ring speed of 200 RPM and cassette speed of 0 RPM, the disc speed ($\omega\_disc$) is 120 RPM.

In this example, 'Regen' is predefined as follows: Regen=0.9.

According to this example, when the user applies the brake, the planet carrier, e.g., planet carrier 122, may slow down, the cassette 12*a* and electric motor 1000, may begin to rotate, and the control system 20 may regulate motor braking torque (i.e., negative torque) so that the electric motor may rotate at a speed satisfying the SP requirement.

$$SP = 200 * (-1.5) * 0.9 = -270 \quad (2)$$

In order to satisfy the SP requirement, PV should equal SP, in order to avoid presence of error 608:

$$PV = \omega\_cassette => \omega\_cassette = -270 \quad (1)$$

Thus, the required braking mode cassette speed for the e-bike speed of the present example, is −270 RPM, which means the cassette should rotate at a speed of 270 RPM at a direction opposite the direction of rotation of the rear wheel 100*a*.

Accordingly, following equation (3), for a rear wheel speed of 200 RPM and cassette speed ($\omega\_cassette$) 616 of −270 RPM, the disc brake speed ($\omega\_disc$) 622 would be 12 RPM.

If the user applies more pressure on the brake, the planet carrier 122 will decrease its speed and consequently the cassette 12a will increase its speed, for example, to −280 RPM. Thus, control system 20 will be required to increase brake torque to get the cassette speed 616 back to −270 RPM, in order to continuously satisfy the SP requirement by maintaining equality between the PV and the SP. If the user applies less pressure on the brake, the planet carrier 122 will increase its speed and consequently the cassette 12a will decrease its speed, for example, to −260 RPM. Thus, the control system will decrease brake torque to get the cassette speed 616 back to −270 RPM, in order to continuously satisfy the SP requirement. Thus, the more pressure is applied on the brake by the user, the more the control system 20 increases brake torque, while the less pressure applied on the brake, the less brake torque is applied by control system 20, which enables intuitive operation of the brake by the user.

In some embodiments, the control system 20, e.g., via processor 22, responds to changes in cassette speed 616 by adjusting brake/negative torque that is applied onto the electric motor 1000, in a continuous manner, in order to maintain fulfillment of the SP requirement throughout the entire operation of the vehicle.

In some embodiments, the percentage of energy lost on the mechanical friction brake, e.g., disc brake 114, is proportional to the 'braking mode' planet carrier speed vs. 'coasting mode' planet carrier speed, which in this example is 10%:

12/120=10%. That is, only 10% of the braking energy will be dissipated by the friction brake, while the rest of the energy may be available for regenerative braking.

Accordingly, by adjusting the value of 'Regen' to be as close to 1 as practically possible, while 'Regen' is still smaller than 1, in order to enable brake torque adjustment by the control system 20, energy loss due to friction brake may be minimal, which means the system that would enable regenerative braking via a mid-drive e-bike, comprising rear wheel hub 100, according to the present disclosure, is highly energy efficient.

The value of 'Regen' must be smaller than 1, since controller or control system 20, e.g., via processor 22, determines the amount of negative torque applied on electric motor 1000 based on the value of error 608, i.e., in proportion to the amount that PV is higher than SP. That is, in order to generate negative torque a negative error 608 is required. If the value of 'Regen' would have been equal to 1, then the PV ratio could not be greater than that of the SP ratio, and the error 608 could not be negative, which means no braking torque would be applied on electric motor 1000.

According to some embodiments, the electric motor 1000 may have a minimum braking torque that is not zero, and a braking torque below that minimum may be achieved by applying gentle pressure on the brake system, hence transferring only partial torque from the rear wheel 100a to the electric motor 1000. According to the example hereinabove, when coasting at 200 RPM, the user may apply the brakes very lightly, thereby slowing the planet carrier 122 from its coasting speed of 120 RPM to a slightly lower speed e.g., 110 RPM, causing the cassette 12a to rotate slowly at −25 RPM, following equation (3). In such a scenario, the absolute value of the PV is smaller than the absolute value of the SP, thus error 608 is positive. Accordingly, control system 20 will apply zero negative torque and no energy will be regenerated. However, since the electric motor 1000 has some internal friction, it will gently slow the ebike in proportion to the electric motor's speed, which is controlled by the amount of brake force applied by the user.

In some embodiments, the e-bike need not require a designated sensor to detect brake handle/pedal position. Instead, the adjustment of brake torque applied on the electric motor 1000 may be determined by the control system 20 in response to the amount of brake applied by the user on the brake handle/pedal, as explained hereinabove. Thus, no change is required to existing brake mechanisms.

According to some embodiments, when initiating the braking process, the electric motor needs to spin-up from zero to the braking RPM (e.g., −270 RPM for the cassette speed 616, according to the above example). This increase in electric motor speed and cassette speed 616, may be gradual and may be controlled by the amount of brake force applied by the user, as explained hereinabove with respect to braking mode control algorithm 600.

Reference is now made to FIGS. 7-7C, which are schematic illustrations of a side view of a rear wheel with a disc brake speed sensor and a cassette speed sensor, a front view of a disc brake speed sensor, a front view of a cassette speed sensor and a front perspective view of a rear wheel speed sensor, respectively, according to embodiments of the present disclosure. Motor control applications require speed or position sensors of a high resolution. That is, a sensor that provides the angle of a rotating element (e.g., the cassette, the disc brake, etc.) at a high resolution and in a continuous manner. This usually implies placing an encoded ring on the rotating element, e.g., encoded disc brake ring 711 and encoded cassette ring 721 and placing a sensing element, e.g., disc brake speed sensor 710, and cassette speed sensor 720, on the chassis in close proximity to the encoded ring, the sensing element is designed to be able to detect small angular movements of the respective encoded ring.

A low-resolution sensor usually only indicates once every instance that a rotating element (e.g., the rear wheel) completes a full rotation, lacking data of the exact angle of the rotating element at any given time. A low-resolution sensor may be placed onto the rear wheel 100a. The low-resolution speed sensor may include a non-ring element connected to the rear wheel 100a, e.g., element 731, which may rotate along with rotation of rear wheel 100a. The low-resolution speed sensor may further comprise a stationary speed sensor 730, which may be connected to the chassis of the ebike. Accordingly, speed sensor 730 may detect completion of an entire rotation of rear wheel 100a, via detection of the location of element 731, e.g., that element 731 is in close proximity to speed sensor 730. However, speed sensor 730 cannot detect the exact location of element 731, since element 731 is not an entire ring surrounding rear wheel 100a, but rather a single element with one single location with respect to rear wheel 100a.

In some embodiments, placing a high-resolution speed sensor on the rear wheel 100a may be difficult to implement. Accordingly, placing a high-resolution speed sensor on the disc brake 114 is preferred. As is evident by equation (3), the rear wheel speed ($\omega$_wheel or Tr) may be calculated if the disc brake speed 622 ($\omega$_disc or Tc) and the cassette speed 616 ($\omega$_cassette or Ts) are known.

The cassette speed 616 ($\omega$_cassette or Ts) is the speed of the electric motor 1000 multiplied by the specific transmission ratio of the currently used cassette sprocket 12b. Typically, the currently used cassette sprocket 12b is known to the user but is unknown to the control system 20. However, the electric motor speed ($\omega$_motor) is usually known to the control system, as it is typically monitored in contemporary ebikes.

The cassette speed may be obtained by placing a high resolution speed sensor on the cassette, e.g., speed sensor 720 with encoded ring 721, thereby obtaining ω_cassette (Ts) directly, or, by placing a low-resolution easy to implement speed sensor on the rear wheel 100*a*, e.g., speed sensor 730 and rotating element 731, thereby obtaining an approximation of the rear wheel speed (~ω_wheel or ~Tr) and calculating equation (4) for cassette transmission ratio, based on equation (3) for a planetary gearing system:

$$(R + S) \times \omega\_disc = R \times -\omega\_wheel + (\omega\_motor \times transmition\_Ratio) \times S \quad (3)$$

$$\omega\_cassette = \omega\_motor \times transmition\_Ratio \quad (4)$$

whereby:
R denotes no. of Ring gear teeth;
S denotes no. of Sun gear teeth;

The low-resolution rear wheel speed sensor, e.g., speed sensor 730, (which provides an approximation of rear wheel speed: ~ω_wheel) is not sufficient for electric motor control application but it is sufficient for the transmission ratio extrapolation.

Once the currently used transmission ratio is known, i.e., the specific cassette sprocket 12*b* being used, the cassette speed can be accurately determined by the electric motor speed multiplied by the transmission ratio, from equation (4). Thus, calculation of PV is accomplished by first indicating the type of cassette sprocket and only then by the cassette speed.

According to some embodiments, for maximum regeneration during braking mode, control system 20 or processor 22 may be configured to accurately control the speed of the mechanical brake system, e.g., disc brake 114, such that speed of disc brake 114 reaches a predefined Set Point (SP) value 602 that should equal a small fraction of the speed of rear wheel 100*a*, which is equivalent to a high 'Regen' value.

In some embodiments, using only a disc speed sensor for calculating ω_disc, for PV 606, is sufficient for most braking conditions. The set point value (SP) can be a fixed non-zero low speed, as low as the performance of the disc brake speed sensor enables, for maximum regeneration. The lower the disc brake speed is, i.e., the lower PV is, the faster the electric motor 1000 rotates, which is equivalent to a more regenerative mid-drive e-bike.

$$PV = \omega\_disc \quad (iii)$$

$$SP = \text{Fixed Low Speed } (0 < \text{Fixed Low Speed}) \quad (iv)$$

According to some embodiments of the present disclosure, the powertrain system of the present disclosure provides a continuously variable braking torque, from zero negative torque to the maximum negative torque capability of the electric motor 1000, by responding to brake pressure applied by the user in a seamless and intuitive way via the braking mode control feedback loop 600.

Since, as explained hereinabove, the sun gear 101 and chain 12 rotate in a direction opposite the driving direction, during braking mode, which is also regenerative braking mode, the pedals 11 might rotate in that same backwards direction, which could be very disturbing to the rider of the mid-drive e-bike, as it would force the rider to rotate their legs in that opposite direction. Accordingly, the present disclosure further provides a crankset that is arranged to prevent the e-bike's pedals from rotating in a backwards direction.

Figure 8B:
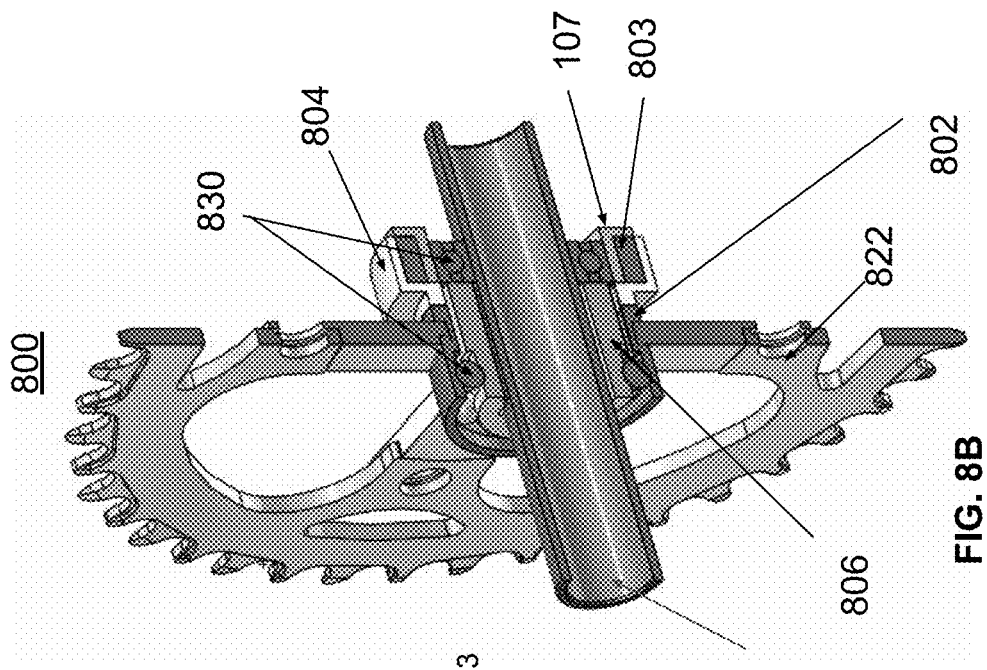
FIGS. 8A-8B are schematic illustrations of a perspective view of the crankset as part of a mid-drive e-bike and of a cross-section of a crankset that allows the pedals of the e-bike to remain idle while the chainring rotates backwards during braking mode, according to embodiments of the present disclosure.
Figure 8A:
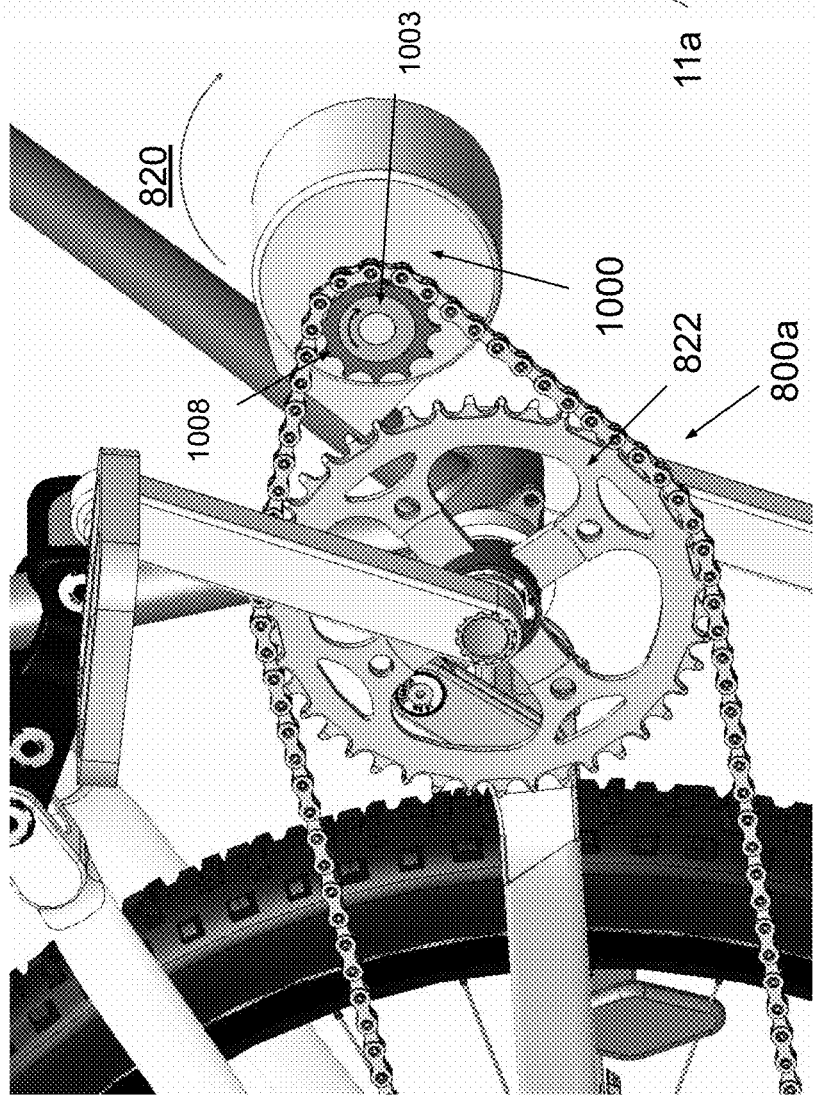

Reference is now made to FIGS. 8A-8B, which are schematic illustrations of a perspective view of the crankset as part of a mid-drive e-bike and of a cross-section of a crankset that allows the pedals of the e-bike to remain idle while the chainring rotates backwards during braking mode, according to embodiments of the present disclosure. Crankset 800*a* of the present disclosure may comprise a self-canceling overrunning clutch 800 configured to disengage the pedals 11 from the chain 12 by backwards rotation of chain 12 vs. chassis 107. That is, the self-canceling overrunning clutch 800 may be automatically conditioned to cancel the polarity of the overrunning clutch, thus when canceled it can allow overrun in both directions. The cancel condition is triggered by backwards rotation of the chain vs. the chassis. According to some embodiments, self-canceling overrunning clutch 800 may comprise:

(a) a chainring or chainring ratchet 802, which is a ratchet element to which the chain, e.g., chain 12, of the e-bike, e.g., e-bike 10, is fastened and onto which the chain is rotated;

(b) a cancel-ring ratchet or canceler ratchet 804, which is a ratchet element comprising a one-way clutch 803; and (c) pedal pawl element 806, which is connected to the pedals, e.g., pedals 11, of the e-bike, e.g., e-bike 10.

According to some embodiments, one-way clutch 803 may be a sprag clutch, roller clutch, ratchet & pawl clutch, or any other similar one-way mechanism. One-way clutch 803 may be connected to chassis 107. One-way clutch 803 allows canceler ratchet 804 to rotate along the forward driving direction, indicated by arrow 820, with respect to chassis 107, and prevents canceler ratchet 804 from rotating backwards, i.e., opposite the forward driving direction, with respect to chassis 107.

In some embodiments, crankset 800*a* may comprise bearings 830, to enable rotation of each of the rotating elements in crankset 800*a*, e.g., chainring ratchet 802, canceler ratchet 804 and pedal pawl element 806.

Figure 9A:
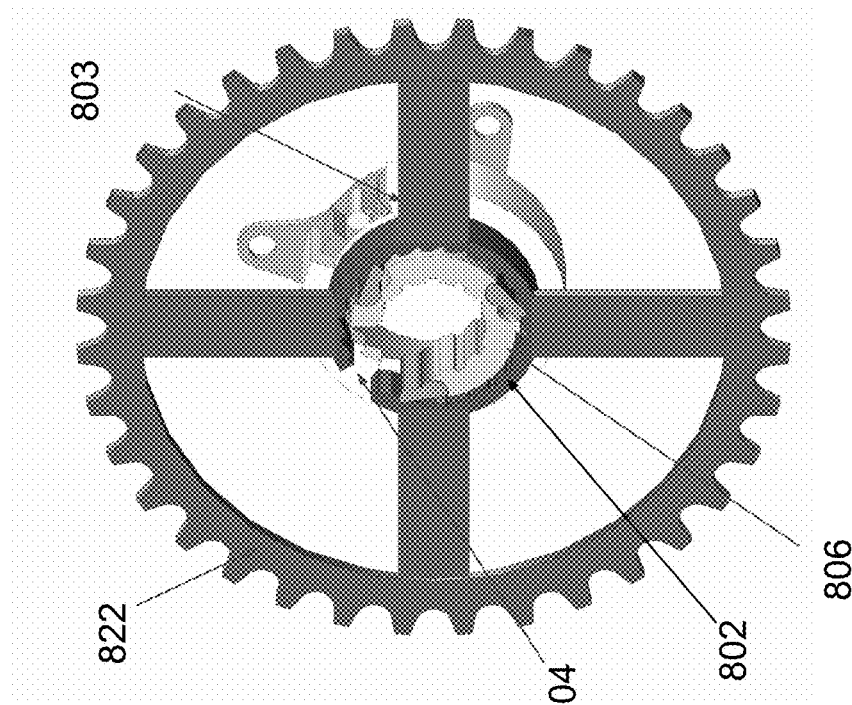
FIGS. 9A-9B are schematic illustrations of a perspective view and an enlarged perspective view, respectively, of the inside of a self canceling overrunning clutch, according to embodiments of the present disclosure.
Figure 9B:
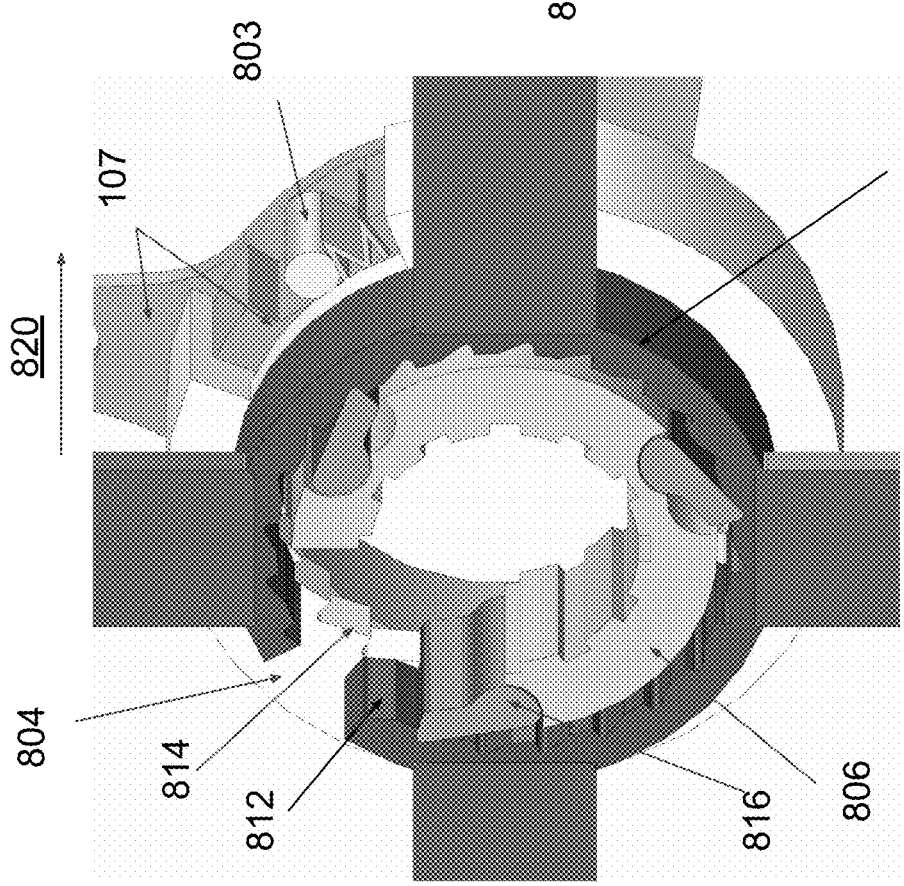

As illustrated in FIGS. 9A-9B, which are schematic illustrations of a perspective view and an enlarged perspective view, respectively, of the inside of self-canceling overrunning clutch 800, canceler ratchet 804 may comprise at least one canceler tooth 814. At least one canceler tooth 814 may be located at and protruding from the internal side of canceler ratchet 804, being the side that is closer to the axis of rotation 11*a* of pedals 11, compared to the external side of canceler ratchet 804. In some embodiments, chainring ratchet 802 may comprise at least one chainring ratchet tooth 812, which may be positioned along and protrude from the internal side of chainring ratchet 802. The internal side of chainring ratchet 802 being closer to the axis of rotation 11*a* of pedals 11, compared to the external side of chainring ratchet 802.

In some embodiments, pedal pawl element 806 may comprise at least one pawl 816. At least one pawl 816 may be positioned along and protruding from the external side of pedal pawl element 806, such that at least one pawl 816 may interact, e.g., come in contact with at least one chainring ratchet tooth 812, and with at least one canceler tooth 814.

According to some embodiment, the width of at least one pawl 816 may be larger than the width of each of at least one chainring ratchet tooth 812 and at least one canceler tooth 814. Thus, at least one chainring ratchet tooth 812 is engaged with only a part of at least one pawl 816, and at least one canceler tooth 814 is engaged with only another part of at least one pawl 816. In some embodiments, the width of either of at least one chainring ratchet tooth 812 and at least one canceler tooth 814 may be larger than the other, while width of each of at least one chainring ratchet tooth 812 and at least one canceler tooth 814 is smaller compared to the width of at least one pawl 816. The width of at least one pawl 816 may be equal to the sum of the width of at least one chainring ratchet tooth 812 and the width of at least one canceler tooth 814.

In some embodiments, self-canceling overrunning clutch 800 may comprise a plurality of chainring ratchet teeth 812, and a plurality of canceler teeth 814, whereby these teeth may be positioned one after the other and located along the inner side of each of chainring ratchet 802 and canceler ratchet 804, respectively. Optionally, the same corresponding number may be implemented per each of at least one chainring ratchet tooth 812 and at least one canceler tooth 814 as they are positioned one next to the other. The number of the at least one pawl 816 may be smaller compared to the number of at least one chainring ratchet tooth 812 and at least one canceler tooth 814.

Reference is made to FIGS. 10A-10B, which are schematic illustrations of perspective views of the chainring ratchet 802 and the canceler ratchet 804. FIG. 10C schematically illustrates an enlarged view of at least one pedal pawl 816 with respect to at least one chainring ratchet tooth 812, and at least one canceler tooth 814. As illustrated in FIGS. 10A-10B, dimensions of chainring ratchet 802, specifically dimensions of the at least one chainring ratchet tooth 812, and dimensions of canceler ratchet 804, specifically dimensions of the at least one canceler tooth 814, are designed to guarantee free travel of the chainring 822 when the at least one pawl 816 is retracted by the at least one canceler tooth 814 of canceler ratchet 804.

In some embodiments, as illustrated in FIG. 10C, the at least one canceler tooth 814 protrudes more inwardly, i.e., towards the axis of self-canceling overrunning clutch 800, compared to the at least one chainring tooth 812. For example, and as illustrated in FIG. 10C, the at least one canceler tooth 814 protrudes inward more than the inward protrusion of the at least one chainring tooth 812 by a distance 834. Accordingly, at least one canceler tooth 814 may push further inward against at least one pawl 816, compared to how at least one chainring ratchet tooth 812 may press against at least one pawl 816. That is, at least one pawl 816 may be pressed such to fold into a more retracted position when pressed by at least one canceler tooth 814 compared to its retracted position when at least one pawl 816 is pressed by at least one chainring ratchet tooth 812.

In some embodiments, during a pedals' forward motion, e.g., during driving mode, when the pedals. e.g., pedals 11, are manually rotated by a user of the mid-drive e-bike, the pedal pawl element 806 rotates forward, in the direction indicated by arrow 820 (FIG. 8B). The pedal pawl element 806 is engaged with both chainring ratchet 802 and canceler ratchet 804 since at least one pawl 816 is wide enough to be engaged with both at least one chainring ratchet tooth 812 and at least one canceler tooth 814. Thus, when pedal pawl element 806 rotates forward, at least one pawl 816 rotates forward and thereby forces chainring ratchet 802 and canceler ratchet 804 to rotate forward via a forced forward rotation of their respective teeth, i.e., at least one chainring ratchet tooth 812 and at least one canceler tooth 814.

In some embodiments, pedals backwards motion manually induced by a user of the mid-drive e-bike, is free and does not cause any drag of chainring ratchet 802 and canceler ratchet 804. Due to the orientation of at least one pawl 816, with respect to at least one chainring ratchet tooth 812 and at least one canceler tooth 814, when at least one pawl 816 rotates backwards (i.e., opposite arrow 820), at least one pawl 816 slides along each of at least one chainring ratchet tooth 812 and at least one canceler tooth 814, thereby not dragging chainring ratchet 802 and canceler ratchet 804.

In some embodiments, during forward motion of the chainring, e.g., chainring 822 (FIGS. 8A-8B), which may occur during driving mode of the mid-drive e-bike, when electric motor 1000 rotates in the forward direction, indicated by arrow 820, chainring 822 may freely rotate forward without dragging the pedals, e.g., pedals 11 and without dragging canceler ratchet 804. The chainring ratchet 802 is connected to chainring 822, and comprises at least one chainring ratchet tooth 812. When chainring 822 rotates forward, so does chainring ratchet 802. At least one chainring ratchet tooth 812 thus also rotates forward, and slides along at least one pawl 816, thereby not dragging at least one pawl 816. Further, since at least one chainring ratchet tooth 812 rotates independently from at least one canceler tooth 814, thereby forward rotation of at least one chainring ratchet tooth 812 does not drag at least one canceler tooth 814.

Reference is now made to FIGS. 11A-11D, which are schematic illustrations of the at least one pawl 816 as it is pushed first by the at least one chainring ratchet tooth 812 and finally retracted by the at least one canceler tooth 814, during backwards rotation of chainring 822, according to embodiments of the present disclosure. According to some embodiments, during backwards motion of chainring 822, which may occur during braking mode of the mid-drive e-bike, when the mechanical brake, e.g., disc brake 114 (FIGS. 2A-2B) causes backwards rotation of electric motor 1000, the pedals of the mid-drive e-bike may remain idle and not be dragged backwards along with chainring 822.

As explained hereinabove, canceler ratchet 804 cannot rotate backwards vs. chassis 107 due to one-way clutch 803. Backwards rotation of chainring 822 drags the pedals 11 only slightly backwards, until each of the at least one pawl 816 is forced to its retracted position by the stationary at least one canceler tooth 814. According to some embodiments, chainring ratchet 802, when rotating backwards with chainring 822, forces at least one pawl 816 to rotate backwards with chainring ratchet 802 (FIG. 11A). This is since at least one chainring ratchet tooth 812 engages with at least one pawl 816 and pushes against the protruding edge 826 of at least one pawl 816. Thereby, to cause each of pawl(s) 816 and thus cause pedal pawl element 806, to slightly rotate backwards, in the direction indicated by arrow 830. Each of the at least one pawl 816 slightly rotates backwards (FIGS. 11B-C), only until the protruding edge 826 of each pawl 816 reaches an inwardly protruding enough point of the canceler tooth 814 (FIG. 11D), thus causing each of the at least one pawl 816 to fold to an inward enough position, which distances the pawl 816 away from any chainring ratchet tooth 812. Once pawl(s) 816 is folded to a retracted enough position by a canceler tooth 814, each of the at least one pawl 816 is no longer engaged by any chainring ratchet tooth 812. Thus, backwards rotation of chainring 822 and of chainring ratchet 802 has only a slight effect on backwards rotation of pedals 11, only until each of the at least one pawl 816 is retracted by at least one canceler tooth 814 and is no longer engaged by any chainring ratchet tooth 812. The retracted pawl(s) 816 is no longer being pushed by the backwards rotating at least one chainring ratchet tooth 812, allowing the pedals 11, which are connected to pedal pawl element 806, to remain idle when chainring 822 continues to rotate backwards. Accordingly, the configuration of crankset 800a enables chain 12 to maintain its backwards rotation, during (regenerative) braking mode of the mid-drive e-bike, without dragging the pedals to rotate backwards along with chain 12. Thus, pedals 11 remain idle when chain 12 is rotated backwards during regenerative braking, unless the pedals are manually activated and rotated backwards by a user of the mid-drive e-bike.

Figure 12B:
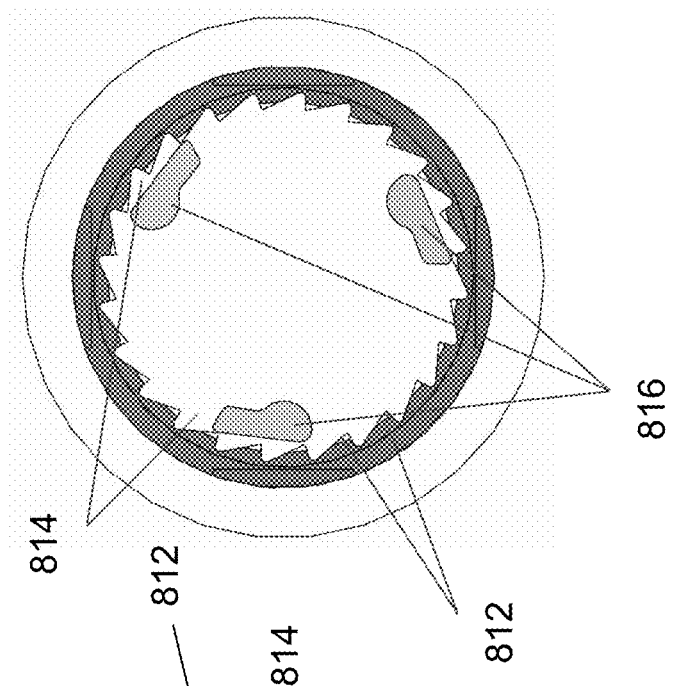
FIGS. 12A-12B schematically illustrate a pawl as it is in fully retracted position, according to embodiments of the present disclosure.
Figure 12A:
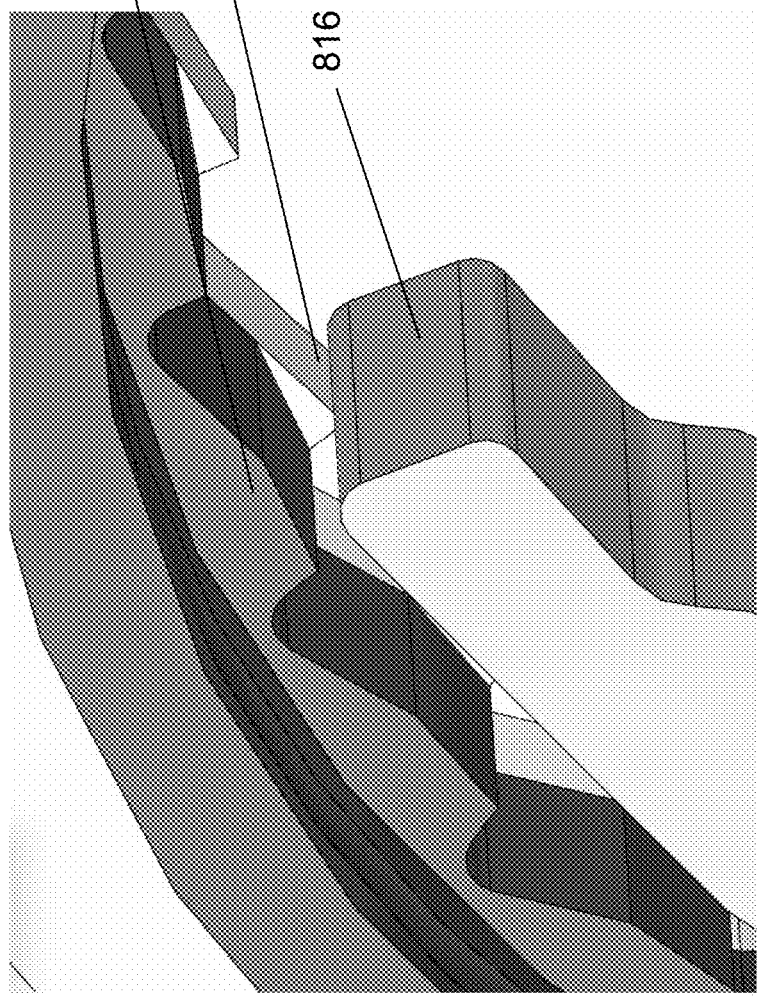

FIGS. 12A-12B, schematically illustrate the at least one pawl 816 as it is in fully retracted position, i.e., during braking mode, when chainring 822 rotates backwards, according to embodiments of the present disclosure. FIG. 12A illustrates at least one pawl 816 being pushed or pressed down by at least one canceler tooth 814, thus no longer being pushed by or engaged with at least one chainring ratchet tooth 812. FIG. 12B illustrates an example of a crankset 800a comprising three pawls 816, each fully retracted by a corresponding canceler tooth 814. In the example illustrated in FIG. 12B, the number of canceler teeth 814, which corresponds to the number of respective chaining ratchet teeth 812, is larger than the number of pawls 816.

Figure 13:
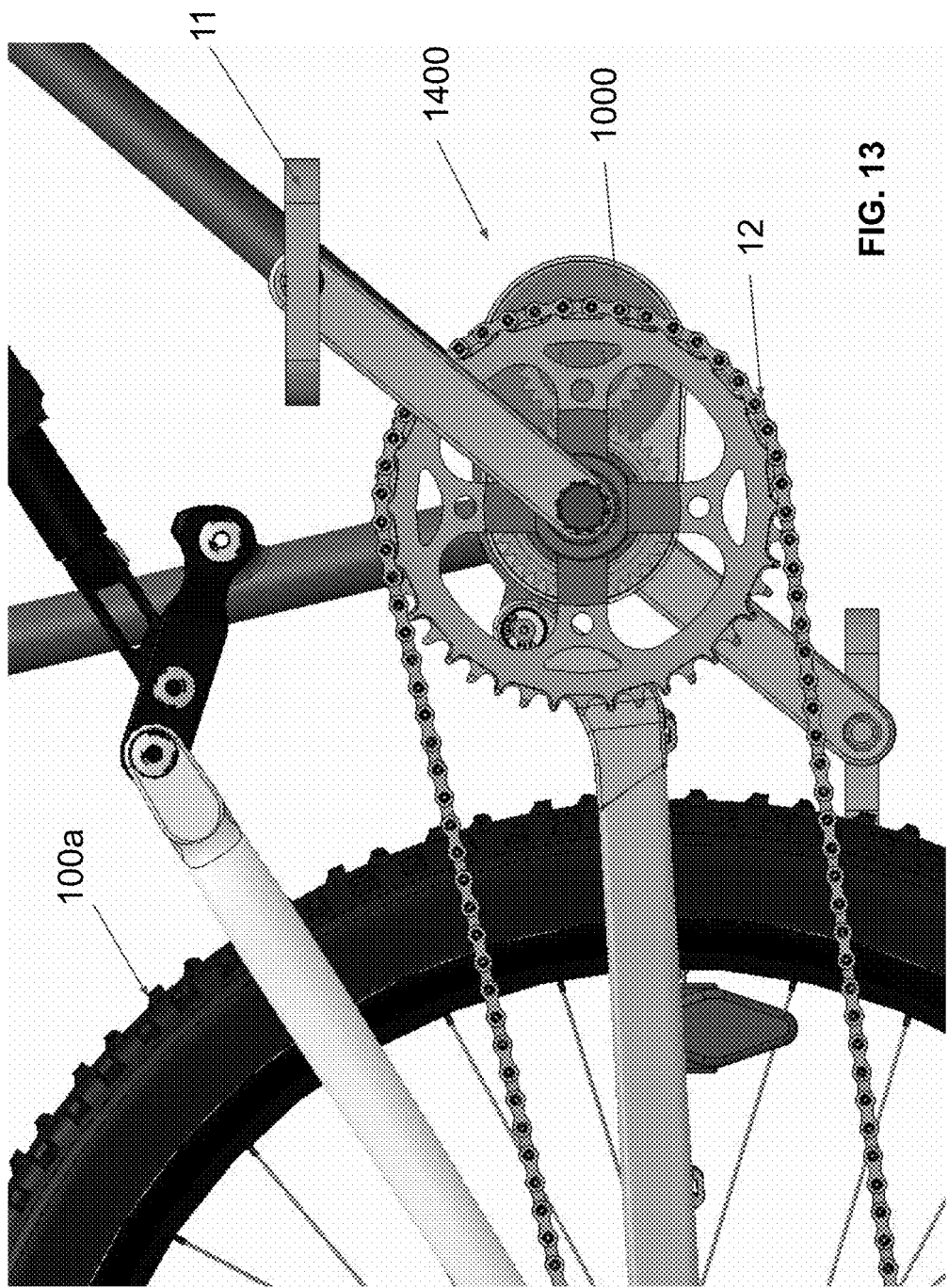
FIG. 13 is a schematic illustration of a perspective view of a crankset encapsulating an electric motor within, as part of an e-bike, according to embodiments of the present disclosure.
Figure 14A:
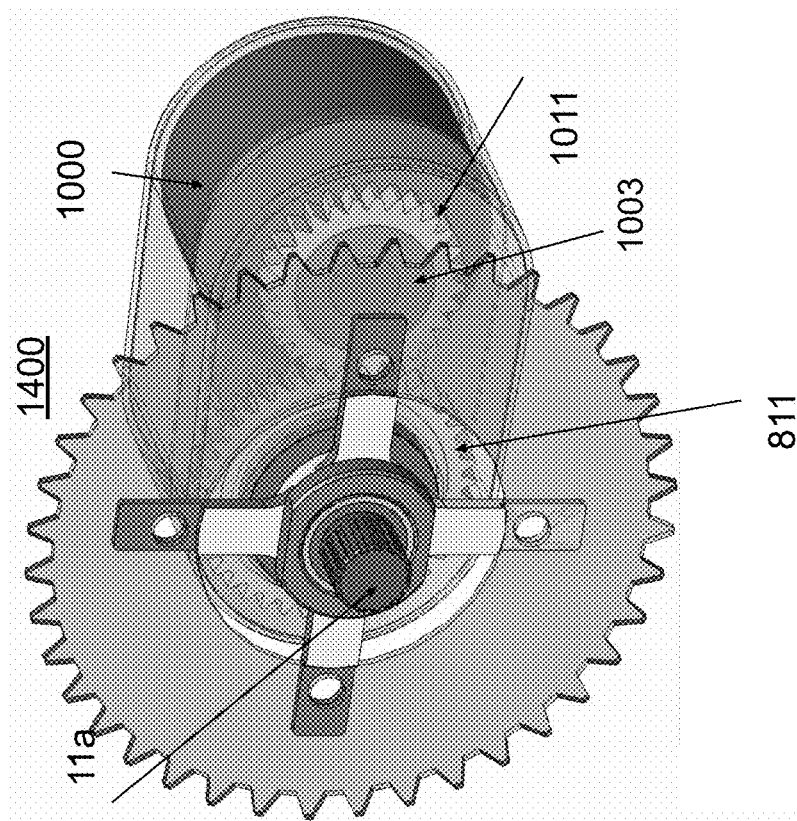
FIGS. 14A-14B schematically illustrate a perspective view of a crankset comprising an electric motor and a cross-section of the crankset, respectively, according to embodiments of the present disclosure.
Figure 14B:
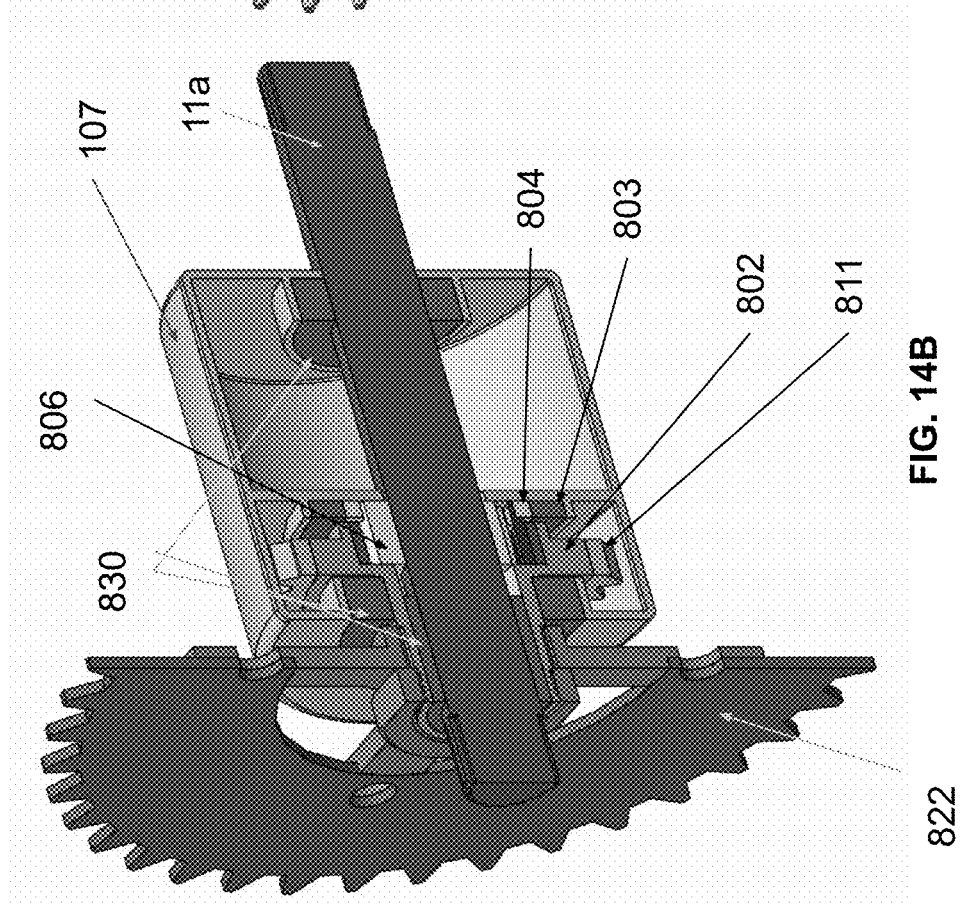

Reference is now made to FIGS. 13 and 14A-14B, which schematically illustrate a perspective view of a crankset 1400 encapsulating an electric motor within, as part of an e-bike, a perspective view of a crankset comprising an electric motor and a cross-section of the crankset, respectively, according to embodiments of the present disclosure. As is common in contemporary mid-drive e-bikes, the electric motor 1000 is rotatably connected to the chainring 822. The electric motor 1000 may comprise a one-way clutch 1003 to allow the electric motor 1000 to rest when the chainring 822 and chain 12 rotate forward by pedal power, thereby following the condition that speed of the chainring 822 is equal or higher than speed of the electric motor 1000 ($\omega\_chainring \geq \omega\_motor$). The connection between electric motor 1000 to chainring 822 is commonly either externally via a chain 12 (FIG. 8A) or internally via gears, i.e., motor gear 1011 and chainring gear 811, which are rotatably connected, as illustrated in FIGS. 13, 14A-14B. The rest of the design of crankset 1400 is similar to that of crankset 800a, as detailed hereinabove, thereby enabling the pedals to remain idle when the chaining 822 rotates backwards, during braking mode.

Figure 15:
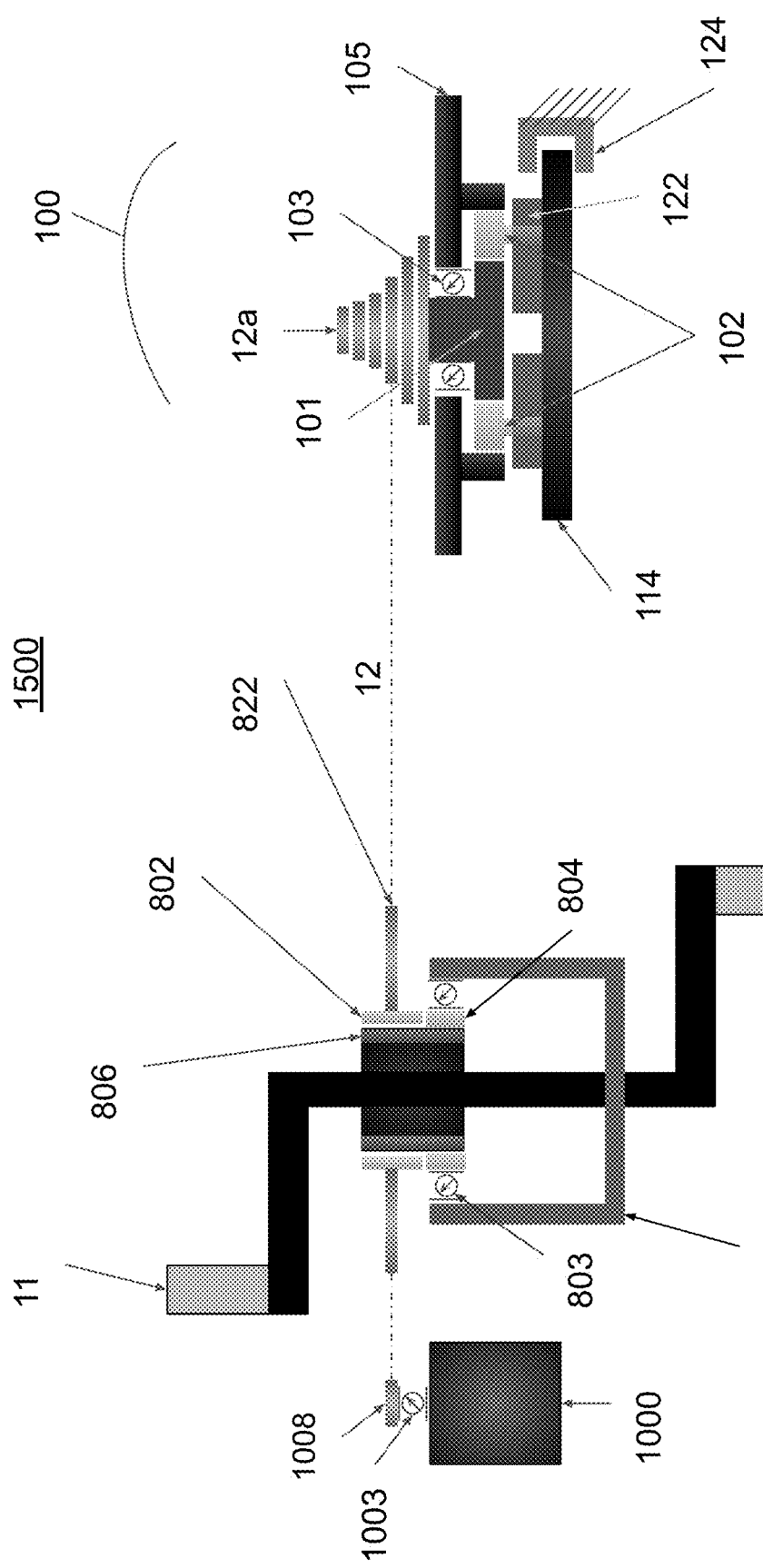
FIG. 15 is a schematic illustration of a system comprising a rear wheel hub, a mid-drive electric motor and a crankset, according to embodiments of the present disclosure.

Reference is now made to FIG. 15, which schematically illustrates a system comprising a rear wheel hub, a mid-drive electric motor and a crankset, according to embodiments of the present disclosure. According to the present disclosure, system 1500 may comprise electric motor 1000, that may be rotatably connected to chainring 822 either externally via a motor sprocket 1008 and an extension of chain 12 or internally via gears (FIGS. 13, 14A-14B). In some embodiments, system 1500 may comprise a crankset, e.g., crankset 800a or 1400, which may be rotatably connected to chain 12 via chainring 822. In some embodiments, system 1500 may comprise rear wheel hub 100, which may be rotatably connected to chain 12 via cassette 12a. In some embodiments, system 1500 may enable a mid-drive e-bike equipped with a standard derailleur system to perform regenerative braking by causing backwards rotation of chain 12, while avoiding the need to perform significant and complicated changes to current mid-drive e-bikes. System 1500 may further enable the pedals, e.g., pedals 11, to remain idle during that backwards rotation of chain 12, which enables regenerative braking, instead of dragging the pedals to rotate backwards, such that the mid-drive e-bike is more user-friendly.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed is:

1. A powertrain of a mid-drive electric bicycle for regenerative braking comprising:
   a mid-drive electric motor;
   a chain rotatably connected to the mid-drive electric motor;
   a gearing system mounted in a rear wheel hub, the gearing system is rotatably connected to the chain; and
   a mechanical brake connected to a component of the gearing system,
      wherein during driving mode, the mid-drive electric motor and the chain rotate in a forward driving direction; and
      wherein during operation of the mechanical brake, the gearing system is configured to cause rotation of the chain in a backward direction opposite to the forward driving direction, which mechanically forces the mid-drive electric motor to rotate in the backward direction, to thereby regenerate electric energy.

2. The mid-drive electric bicycle gearing system of claim 1, wherein the mid-drive electric bicycle is compatible with a transmission that allows tension of the chain only on a top side of the chain as in a standard derailleur gearing system.

3. The powertrain of claim 1, wherein the gearing system is a gearing system with two-degrees-of-freedom comprising at least three components configured to rotate with respect to one another, said gearing system configured to transfer power from the chain to a rear wheel of the mid-drive electric bicycle, wherein in coasting mode, the two-degrees-of-freedom of the gearing system allow the chain to rest while the rear wheel is rotating in the forward driving direction;

wherein in driving mode, one degree of freedom of the gearing system is fully reduced by operation of a one-way mechanism, forcing rotation of the rear wheel in the forward driving direction by forward rotation of the chain; and further wherein in braking mode, one degree of freedom of the gearing system is gradually reduced by operation of the mechanical brake, forcing backward rotation of the chain by rotation of the rear wheel in the forward driving direction.

4. The powertrain of claim 3, wherein the gearing system comprises a planetary gear, said planetary gear comprises a sun gear, at least one planet gear, a planet carrier and a ring gear, wherein the sun gear is rotatably connected to the chain, the ring gear is rotatably connected to the rear wheel, and the planet carrier is rotatably connected to the mechanical brake.

5. The powertrain of claim 3, wherein the one-way mechanism is configured to restrict rotation of the ring gear in the forward driving direction with respect to rotation of the sun gear such that speed of the ring gear is equal or larger than speed of the sun gear ($Tr \geq Ts$);

or the one-way mechanism is configured to restrict rotation of the planet carrier in the forward driving direction with respect to rotation of the sun gear such that speed of the planet carrier is equal or larger than speed of the sun gear ($Tc \geq Ts$).

6. The powertrain of claim 3, wherein speed ratio between sun gear and ring gear is 1:1 in driving mode, wherein ratio between number of teeth of the sun gear and number of teeth of the ring gear determines speed ratio between sun gear and ring gear in braking mode alone, and wherein ratio between number of teeth of the sun gear and number of teeth of the ring gear is 1:1, the speed ratio between sun gear and ring gear in 1:1 in braking mode and in driving mode.

7. The powertrain of claim 1, wherein the mechanical brake comprises a disc brake.

8. The powertrain of claim 1, further comprising a crankset configured to prevent rotation of pedals of the electric bicycle in a backwards driving direction during backwards rotation of the chain in braking mode.

9. The powertrain of claim 8, wherein the crankset comprises a self-canceling overrunning clutch that operates to disengage the pedals from the chain by backwards rotation of the chain vs. a chassis of the mid-drive electric bicycle.

10. The powertrain of claim 9, wherein the crankset comprises:

a chainring ratchet connected to a chainring, onto which the chain is rotated;

a canceler ratchet that is restricted to rotate in the direction of forward driving and not to rotate in the backward direction; and a pedal pawl element onto which the pedals of the mid-drive electric bicycle are fastened;

wherein (i) when the pedals are rotated in forward driving direction, the pedal pawl element is configured to engage with the chainring ratchet and the canceler ratchet to thereby force the chainring ratchet and the canceler ratchet to rotate in the forward driving direction, whereas (ii) when the pedals are moved in backward direction, the chainring ratchet and the canceler ratchet are in rest state;

(iii) when the chain is moved in forward driving direction by the mid-drive electric motor, the chainring ratchet is rotated in forward driving direction while the pedals and the canceler ratchet are in rest state; and (iv) when the chain is moved in the backward direction by the gearing system of the rear wheel hub during braking, the chainring ratchet rotates in the backward direction, while the canceler ratchet that is restricted from rotating in the backward direction and is thus in rest state, causes the pedal pawl element to be in rest state and thus prevents the pedals from rotating in the backward direction.

11. The powertrain of claim 10, wherein width and position of the pedal pawl element with respect to the chainring ratchet and the canceler ratchet enable the pedal pawl element to interact with both the chainring ratchet and the canceler ratchet.

12. The powertrain of claim 11, wherein the pedal pawl element comprises at least one pawl, the canceler ratchet comprises at least one canceler tooth and the chainring comprises at least one chainring tooth, wherein width of the pawl is larger than width of each of the at least one canceler tooth and the at least one chainring tooth, and further wherein the at least one canceler tooth is protruding inwards more than the at least one chain-ring tooth.

13. The powertrain of claim 12, wherein when the chainring rotates in the backwards driving direction, the at least one canceler tooth of the canceler ratchet that is in rest state, presses against each of the at least one pawl of the pedal pawl element causing each of the at least one pawl to retract, thereby disengaging the pedal pawl element from the chainring ratchet, which causes the pedal pawl element to cease its rotation while enabling free rotation of the chainring in the backwards driving direction, during braking mode.

14. The powertrain of claim 10, wherein rotation of the canceler ratchet is restricted with respect to a chassis of the mid-drive electric bicycle by a one-way clutch.

15. A mid-drive electric bicycle gearing system comprising:

a mid-drive electric motor;

a chain rotatably connected to the mid-drive electric motor;

a cassette comprising a cassette sprocket;

a gearing system mounted in a rear wheel hub, the gearing system is rotatably connected to the chain via the cassette; and a mechanical brake connected to a component of the gearing system, said mechanical brake comprising a disc brake, wherein during driving mode the mid-drive electric motor and the chain rotate in a forward driving direction; and wherein during operation of the mechanical brake, the gearing system is configured to cause rotation of the chain in a backward direction opposite to the forward driving direction, which mechanically forces the mid-drive electric motor to rotate in the backward direction, to thereby regenerate electric energy; and a control system configured to control an amount of power supplied by the mid-drive electric motor during the driving mode, and to control an amount of negative braking torque applied by the mid-drive electric motor during the regenerative braking mode, said control system comprising a processor configured to:
- predefine a set point value;
- calculate a process value; and
- determine an amount of negative braking torque required for equality between the process value and the set point value.

16. The mid-drive electric bicycle gearing system of claim 15, wherein the process value is based on speed of the cassette sprocket, and wherein the set point value is based on: (i) speed of the rear wheel, (ii) transmission ratio of the gearing system and (iii) a parameter modifiable according to required regeneration ratio.

17. The mid-drive electric bicycle gearing system of claim 16, wherein the required regeneration ratio is determined by at least one of: battery/capacitor state of charge (SOC), power ratings, driving speed, motor load, terrain, temperature, or any combination thereof.

18. The mid-drive electric bicycle gearing system of claim 16, further comprising a cassette speed sensor and a disc brake speed sensor, wherein said speed of the rear wheel is calculated based on disc brake speed that is measured by disc brake speed sensor and based on speed of the cassette sprocket that is measured by cassette speed sensor.

19. The mid-drive electric bicycle gearing system of claim 15, wherein the process value is based on speed of the disc brake, and wherein the set point value is a fixed non-zero low speed.

20. The mid-drive electric bicycle gearing system of claim 19, further comprising:
- (i) a motor speed sensor to measure motor speed,
- (ii) a low resolution rear wheel speed sensor to measure approximate rear wheel speed; and
- (iii) a disc brake speed sensor;

wherein a selected cassette sprocket gear ratio is calculated based on the approximate rear wheel speed and the motor speed, the speed of the cassette sprocket is calculated based on the motor speed and the selected cassette sprocket gear ratio, and speed of the rear wheel is calculated based on disc brake speed that is measured by disc brake speed sensor and based on said calculated speed of the cassette sprocket.

* * * * *